United States Patent
Koudo et al.

(10) Patent No.: US 10,416,511 B2
(45) Date of Patent: Sep. 17, 2019

(54) LIQUID CRYSTAL DISPLAY DEVICE

(71) Applicant: Panasonic Liquid Crystal Display Co., Ltd., Himeji-shi, Hyogo (JP)

(72) Inventors: Toshikazu Koudo, Hyogo (JP); Masahiro Ishii, Hyogo (JP); Katsuhiro Kikuchi, Hyogo (JP); Ikuko Mori, Hyogo (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 31 days.

(21) Appl. No.: 15/688,376

(22) Filed: Aug. 28, 2017

(65) Prior Publication Data
US 2018/0059465 A1 Mar. 1, 2018

(30) Foreign Application Priority Data

Aug. 31, 2016 (JP) .................................. 2016-169534
Oct. 21, 2016 (JP) .................................. 2016-207278

(51) Int. Cl.
*G02F 1/1347* (2006.01)
*G09G 3/36* (2006.01)
*G02F 1/1335* (2006.01)

(52) U.S. Cl.
CPC ....... *G02F 1/13471* (2013.01); *G09G 3/3648* (2013.01); *G02F 2001/133531* (2013.01); *G09G 2300/023* (2013.01)

(58) Field of Classification Search
CPC ............................ G09G 3/3648; G02F 1/13471
USPC ............ 345/173, 473, 643, 694; 348/39, 46; 349/33, 61
See application file for complete search history.

(56) References Cited

U.S. PATENT DOCUMENTS

| | | | | |
|---|---|---|---|---|
| 5,432,580 A | * | 7/1995 | Tokuda | G03B 27/32 355/27 |
| 8,553,037 B2 | * | 10/2013 | Smith | G06T 13/40 345/473 |
| 8,821,099 B2 | * | 9/2014 | Hall | H01L 21/67775 118/500 |
| 2005/0133690 A1 | * | 6/2005 | Higashitsutsumi | H01L 27/14621 250/208.1 |
| 2007/0120763 A1 | * | 5/2007 | De Paepe | G06F 3/03547 345/1.3 |

(Continued)

FOREIGN PATENT DOCUMENTS

WO 2007/040139 4/2007

*Primary Examiner* — Prabodh M Dharia
(74) *Attorney, Agent, or Firm* — Hamre, Schumann, Mueller & Larson, P.C.

(57) ABSTRACT

A liquid crystal display device includes: a first display panel displaying a color image, a second display panel that is disposed farther away from the observer with respect to the first display panel and displays a monochrome image, and an image processor that generates color image data and monochrome image data. The image processor includes an extension filtering unit that performs extension filtering on first monochrome image data, which is made monochrome using a maximum value in a value of each color expressing color information included in the input video signal. The extension filtering unit performs the extension filtering on the first monochrome image data using a large filter size in a larger luminance difference region, and performs the extension filtering on the first monochrome image data using a small filter size in a small luminance difference region.

15 Claims, 21 Drawing Sheets

(56) References Cited

U.S. PATENT DOCUMENTS

| | | | |
|---|---|---|---|
| 2008/0192158 A1* | 8/2008 | Yoshihara | G02F 1/13471 349/33 |
| 2009/0015831 A1* | 1/2009 | Yguerabide | C12Q 1/6816 356/337 |
| 2009/0027323 A1* | 1/2009 | Choi | G02F 1/13471 345/88 |
| 2009/0051707 A1 | 2/2009 | Hirata et al. | |
| 2009/0251401 A1* | 10/2009 | Gorog | G09G 3/3426 345/102 |
| 2009/0262259 A1* | 10/2009 | Aoki | G09G 3/20 348/739 |
| 2011/0032454 A1* | 2/2011 | Ikeno | G02F 1/133514 349/81 |
| 2011/0231126 A1* | 9/2011 | Ghosh | G09G 3/006 702/64 |
| 2012/0147468 A1* | 6/2012 | Bell | G02B 5/201 359/491.01 |
| 2012/0268506 A1* | 10/2012 | Ramstad | H04N 13/334 345/694 |
| 2012/0293741 A1* | 11/2012 | Gu | G02F 1/13471 349/61 |
| 2013/0106923 A1* | 5/2013 | Shields | G09G 3/3406 345/690 |
| 2013/0107009 A1* | 5/2013 | Hiramoto | G01C 11/30 348/46 |
| 2016/0086568 A1* | 3/2016 | Imamura | G06F 3/16 345/643 |
| 2016/0295158 A1* | 10/2016 | Van Belle | G06T 3/4007 |
| 2017/0052643 A1* | 2/2017 | Iwami | G06F 3/044 |
| 2018/0286325 A1* | 10/2018 | Koudo | G09G 3/3607 |
| 2019/0066609 A1* | 2/2019 | Hirotsune | G09G 3/2007 |

\* cited by examiner

FIG.9

| LUMINANCE DIFFERENCE (GRAY SCALE) | FILTER SIZE |
|---|---|
| 0~15 | 1x1 |
| 16~31 | 3x3 |
| 32~47 | 5x5 |
| 48~63 | 7x7 |
| 64~79 | 9x9 |
| 80~95 | 11x11 |
| 96~255 | 13x13 |

IMAGE C

FIG.11A
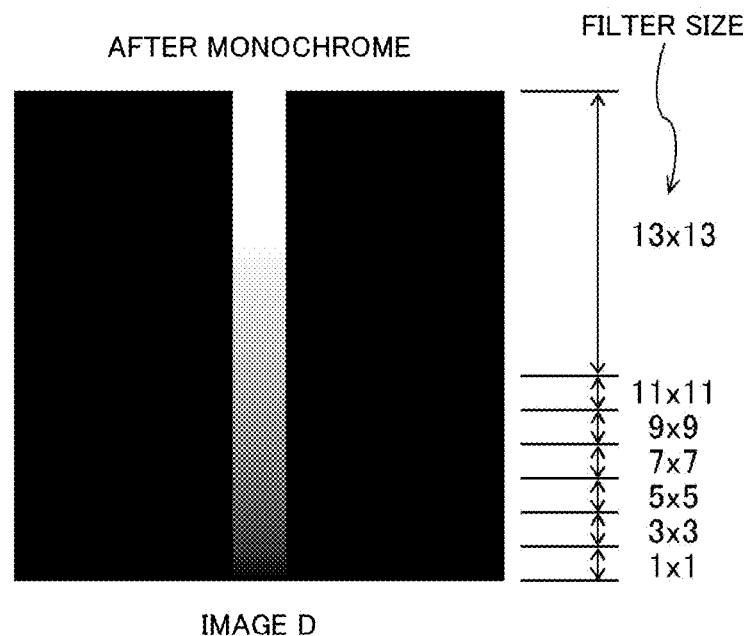
IMAGE D
FIG.11B
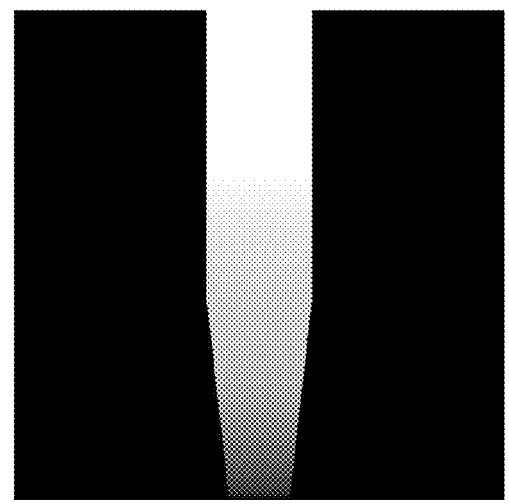
IMAGE E

AFTER SMOOTHING

IMAGE F

FIG.17A  FIRST FILTER TABLE
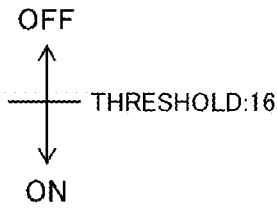
FIG.17B  SECOND FILTER TABLE
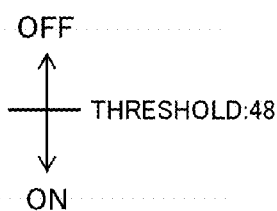

LIQUID CRYSTAL DISPLAY DEVICE

CROSS-REFERENCE TO RELATED APPLICATION

This application claims priority from Japanese application JP 2016-169534, filed Aug. 31, 2016 and Japanese application JP 2016-207278, filed Oct. 21, 2016. These Japanese applications are incorporated herein by reference.

TECHNICAL FIELD

A present invention relates to a liquid crystal display device.

BACKGROUND

A technology, in which two display panels overlap each other and an image is displayed on each display panel based on an input video signal, is conventionally proposed to improve contrast of a liquid crystal display device (for example, see WO 2007/040139). Specifically, for example, a color image is displayed on a front-side (observer-side) display panel in two display panels disposed back and forth, and a monochrome image is displayed on a rear-side (backlight-side) display panel, thereby improving contrast. In the above-described liquid crystal display device, filtering processing (extension filtering) of extending a high-luminance region of the monochrome image is performed such that a desired image is visually recognized without generating an image deviation even if a display screen is obliquely viewed. For example, in the extension filtering, processing of setting the maximum gray scale value in a filter size to a gray scale value of a pixel (target pixel) in a center of a pixel region is performed on all pixels of each frame using a 3-by-3 pixel region as a filter size.

SUMMARY

However, in the conventional liquid crystal display device described above, the luminance of the whole monochrome image increases because the extension filtering is performed using a filter having the size (in the above example, the 3-by-3 pixel region) common to all the pixels of each frame. Therefore, for example, an image having a black-floating level in a dark region is visually recognized in a display image, and display quality is degraded.

The present disclosure is made in consideration of the above-described circumstance, and an object of the present disclosure is to suppress the degradation of the display quality in the dark region of the display image in a liquid crystal display device in which the plurality of display panels overlap each other.

To solve the above problem, a liquid crystal display device according to a present disclosure in which a plurality of display panels are disposed while overlapping each other, an image is displayed on each of the display panels, comprises: a first display panel that is disposed near an observer and displays a color image; a second display panel that is disposed farther away from the observer than the first display panel is and displays a monochrome image; and an image processor that generates first image data corresponding to the color image and second image data corresponding to the monochrome image based on an input video signal, wherein the image processor includes: an extension filtering unit that performs extension filtering on first monochrome image data, which is made monochrome using a maximum value in a value of each color expressing color information included in the input video signal, to set maximum luminance in a filter size as luminance of a target pixel with a region constructed with the target pixel and pixels around the target pixel as the filter size; and a luminance difference determinator that determines a luminance difference in second monochrome image data, which is made monochrome using a luminance signal calculated based on the value of each color expressing the color information, and when the monochrome image corresponding to the second monochrome image data includes a first region having a first luminance difference and a second region having a second luminance difference smaller than the first luminance difference, the extension filtering unit performs the extension filtering on the first monochrome image data using a filter size constructed with a first number of pixels in a region corresponding to the first region, and performs the extension filtering on the first monochrome image data using a filter size constructed with a second number of pixels smaller than the first number of pixels in a region corresponding to the second region.

In the liquid crystal display device according to the present disclosure, the extension filtering unit may perform the extension filtering using the filter size that becomes smaller with decreasing luminance difference.

The liquid crystal display device according to the present disclosure may further comprise a table in which a luminance difference classified into a plurality of levels and a filter size corresponding to each of the levels are stored while associated with each other, wherein the extension filtering unit may refer to the table to select the filter size corresponding to the luminance difference.

In the liquid crystal display device according to the present disclosure, when the target pixel corresponds to white while pixels around the target pixel correspond to red, the extension filtering unit may perform the extension filtering using a larger filter size compared with a case that the target pixel corresponds to the white while the pixels around the target pixel correspond to the white.

In the liquid crystal display device according to the present disclosure, the image processor may perform differential filtering based on the luminance signal in order to detect a boundary at which the luminance changes in the second monochrome image data.

In the liquid crystal display device according to the present disclosure, the image processor may perform common extension filtering on the second monochrome image data subjected to the differential filtering using a filter size common to all pixels in order to set the maximum luminance as the luminance of the target pixel.

In the liquid crystal display device according to the present disclosure, the luminance difference determinator may determine the luminance difference of the second monochrome image data subjected to the common extension filtering.

In the liquid crystal display device according to the present disclosure, the image processor may generate the second image data by performing smoothing on the first monochrome image data subjected to the extension filtering, using a filter size common to all pixels.

The liquid crystal display device according to the present disclosure may further comprise a storage in which a plurality of filter tables are stored, a luminance difference classified into a plurality of levels and filter sizes corresponding to respective levels being stored in each of the filter tables while associated with each other, wherein the extension filtering unit may obtain gamma setting information, select one of the filter tables from the storage based on the obtained gamma setting information, and refer to the selected filter table to perform the extension filtering.

In the liquid crystal display device according to the present disclosure, the gamma setting information may be information about a gamma value that is set in a system provided outside the liquid crystal display device based on the input video signal.

In the liquid crystal display device according to the present disclosure, the storage may include a first filter table and a second filter table, in the first filter table, a filter size constructed with a plurality of pixels may be set in a range where the luminance difference is greater than or equal to a first threshold, and a filter size constructed with only one pixel may be set in a range where the luminance difference is less than the first threshold, in the second filter table, the filter size constructed with the plurality of pixels may be set in a range where the luminance difference is greater than or equal to a second threshold larger than the first threshold, and the filter size constructed with the one pixel may be set in a range where the luminance difference is less than the second threshold, and the extension filtering unit may select the first filter table when the gamma setting information is information corresponding to a standard dynamic range (SDR) video, and may select the second filter table when the gamma setting information is information corresponding to a high dynamic range (HDR) video.

The liquid crystal display device according to the present disclosure may further comprise: a storage in which a plurality of filter tables are stored, the luminance difference and the filter size being associated with each other in each of the filter tables; and an analyzer that analyzes a characteristic of a luminance distribution of the image based on the input video signal, wherein the extension filtering unit may select one of the filter tables from the storage based on the analyzed luminance distribution, and may refer to the selected filter table to perform the extension filtering.

In the liquid crystal display device according to the present disclosure, the image processor may perform differential filtering to detect a boundary where the luminance changes in the second monochrome image data based on the luminance signal, and may perform common extension filtering on the second monochrome image data subjected to the differential filtering to set the maximum luminance as the luminance of the target pixel using a filter size common to all pixels, the image processor may further include a frame memory in which the second monochrome image data subjected to the common extension filtering is stored, and the analyzer may analyze a characteristic of the luminance distribution based on an image of the second monochrome image data stored in the frame memory.

In the liquid crystal display device according to the present disclosure, the storage may include a first filter table and a second filter table, in the first filter table, a filter size constructed with a plurality of pixels may be set in a range where the luminance difference is greater than or equal to a first luminance difference, and a filter size constructed with only one pixel may be set in a range where the luminance difference is less than the first luminance difference, in the second filter table, the filter size constructed with the plurality of pixels may be set in a range where the luminance difference is greater than or equal to a second luminance difference, and the filter size constructed with the one pixel may be set in a range where the luminance difference is less than the second luminance difference, the first luminance difference may be smaller than the second luminance difference, and the extension filtering unit may select the first filter table when a width of the luminance distribution is narrower than a threshold, and may select the second filter table when the width of the luminance distribution is wider than the threshold.

In the liquid crystal display device according to the present disclosure, when the luminance difference is smaller than a threshold, the extension filtering unit may perform the extension filtering using a filter size constructed with only one pixel, and the threshold may be set based on a characteristic of the input video signal.

Owing to the present disclosure, it is possible to suppress the degradation of the display quality in a dark region of the display image in the liquid crystal display device in which the plurality of display panels overlap each other.

BRIEF DESCRIPTION OF THE DRAWINGS

FIG. 9 is a view illustrating an example of a filter table of the first exemplary embodiment;

FIGS. 11A and 11B are views illustrating examples of images before and after extension filtering performed on first monochrome image data;

FIGS. 17A and 17B are views illustrating examples of filter tables according to the second exemplary embodiment;

DETAILED DESCRIPTION

Hereinafter, exemplary embodiments of the present disclosure will be described with reference to the drawings. A liquid crystal display device according to the present exemplary embodiment includes a plurality of display panels that display images, a plurality of driving circuits (a plurality of source drivers and a plurality of gate drivers) that drive the display panels, a plurality of timing controllers that control the driving circuits, an image processor that performs image processing on an input video signal input from an outside and outputs image data to each of the timing controllers, and a backlight that irradiates the plurality of display panels with light from a rear surface side. There is no limitation to a number of display panels, but it is only necessary to provide at least two display panels. When viewed from an observer side, the plurality of display panels are disposed while overlapping each other in a front-back direction. An image is displayed on each of the display panels. Liquid crystal display device 10 including two display panels will be described below by way of example.

Figure 1:
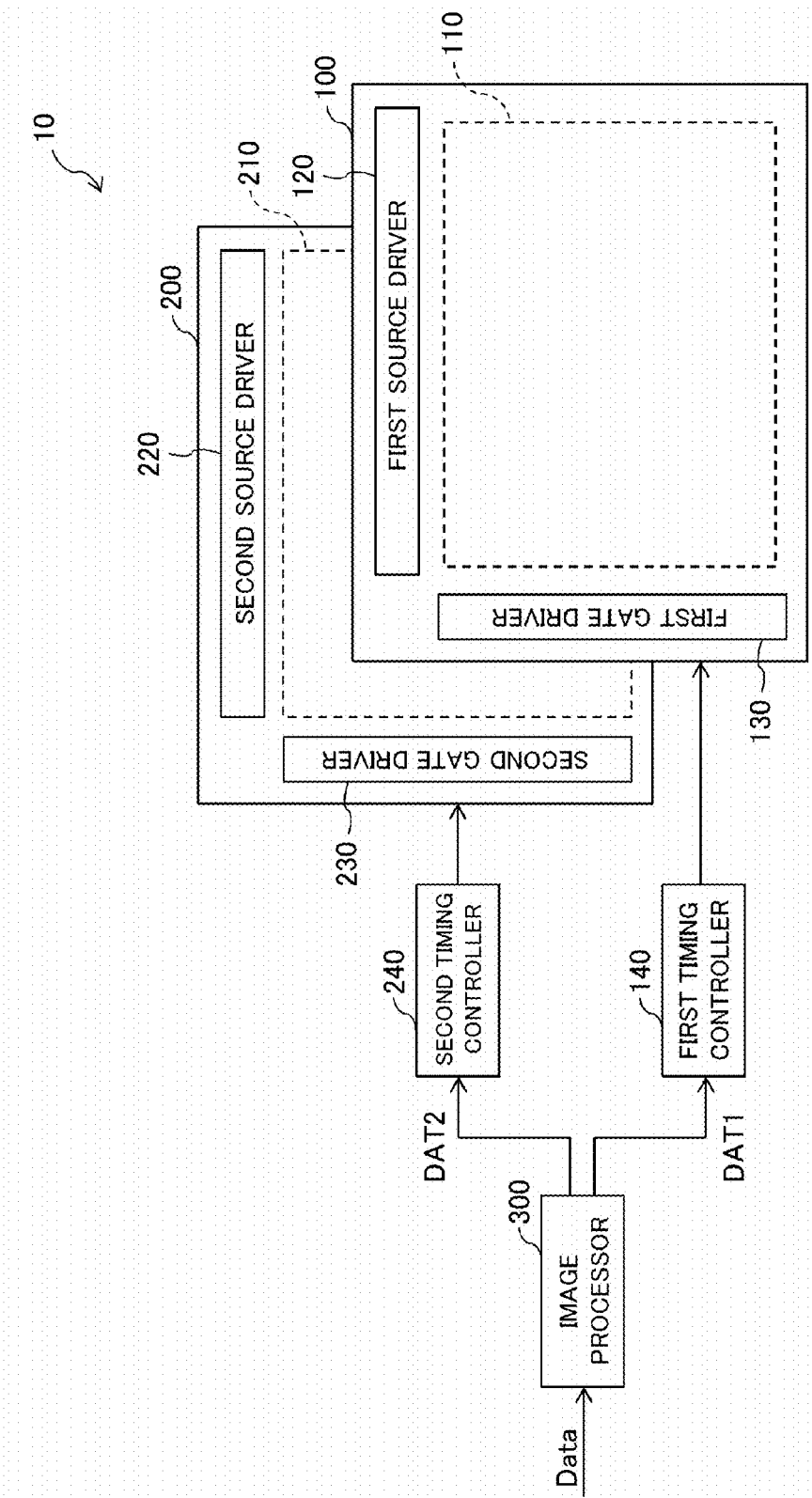
FIG. 1 is a plan view illustrating a schematic configuration of a liquid crystal display device according to the present exemplary embodiment.

FIG. 1 is a plan view illustrating a schematic configuration of liquid crystal display device 10 according to the present exemplary embodiment. As illustrated in FIG. 1, liquid crystal display device 10 includes first display panel 100 disposed closer to an observer (front side), second display panel 200 disposed farther away from the observer (rear side) than first display panel 100, first timing controller 140 that controls first source drivers 120 and first gate drivers 130, first source drivers 120 and first gate drivers 130 being provided in first display panel 100, second timing controller 240 that controls second source drivers 220 and second gate drivers 230, second source drivers 220 and second gate drivers 230 being provided in second display panel 200, and image processor 300 that outputs image data to first timing controller 140 and second timing controller 240. First display panel 100 displays a color image in first image display region 110 according to the input video signal, and second display panel 200 displays a monochrome image in second image display region 210 according to the input video signal. Image processor 300 receives input video signal Data transmitted from an external system (not illustrated), performs image processing (to be described later) on input video signal Data, outputs first image data DAT1 to first timing controller 140, and outputs second image data DAT2 to second timing controller 240. Image processor 300 also outputs a control signal (not illustrated in FIG. 1) such as a synchronizing signal to first timing controller 140 and second timing controller 240. First image data DAT1 is image data for displaying the color image, and second image data DAT2 is image data for displaying the monochrome image. A backlight (not illustrated in FIG. 1) is disposed on a rear surface side of second display panel 200. A specific configuration of image processor 300 will be described later.

Figure 2:
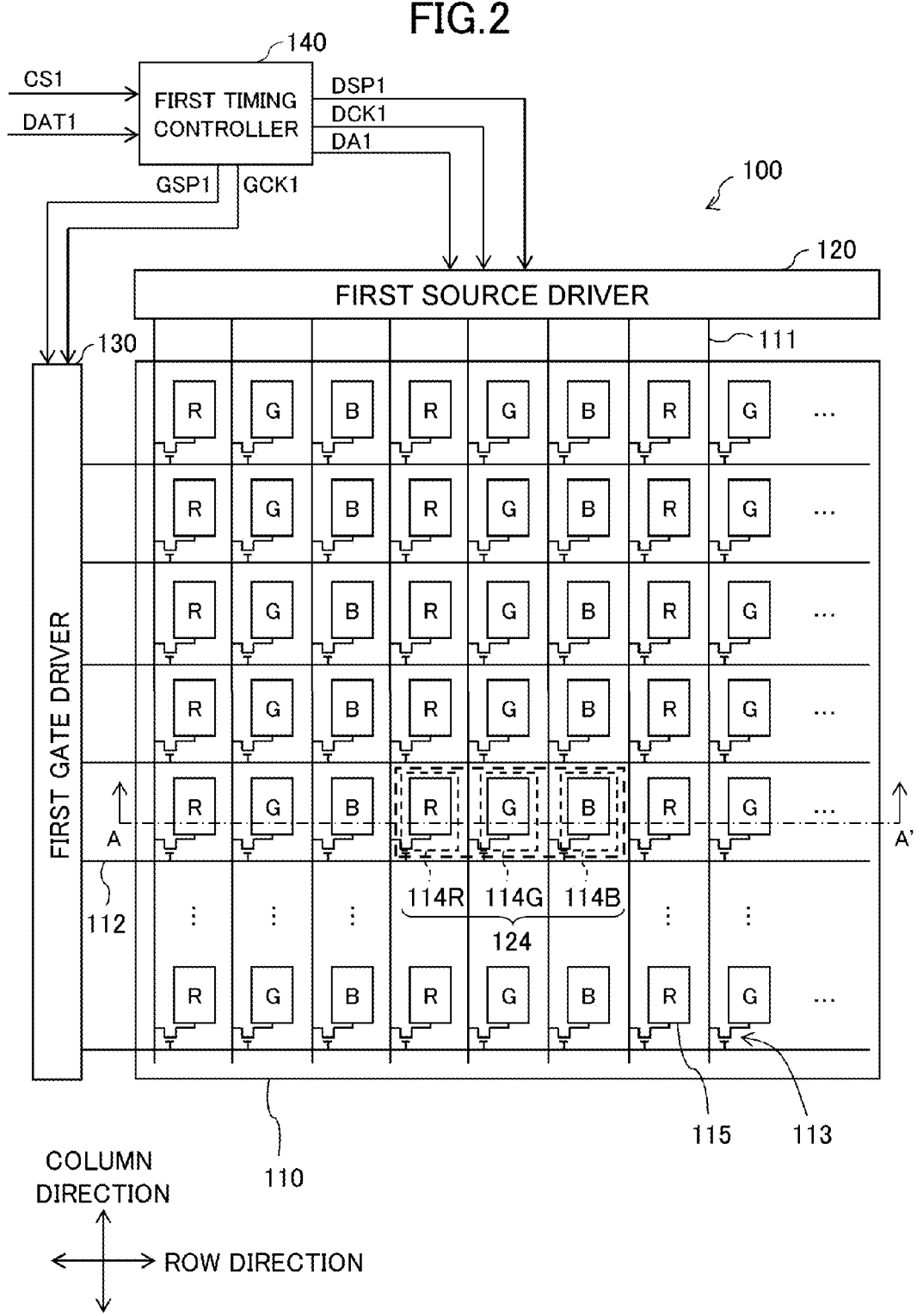
FIG. 2 is a plan view illustrating a schematic configuration of a first display panel according to the present exemplary embodiment.
Figure 3:
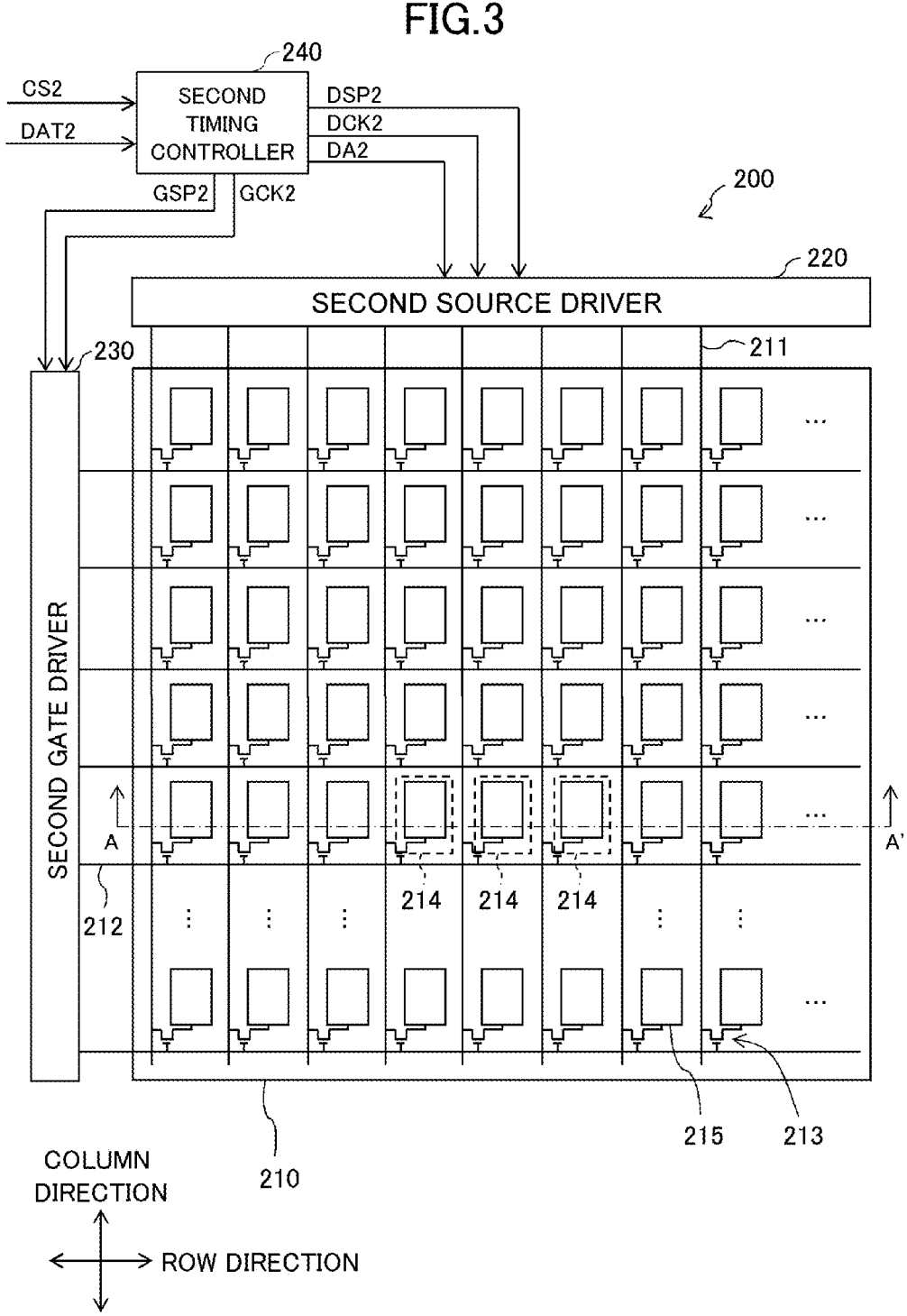
FIG. 3 is a plan view illustrating a schematic configuration of a second display panel according to the present exemplary embodiment.
Figure 4:
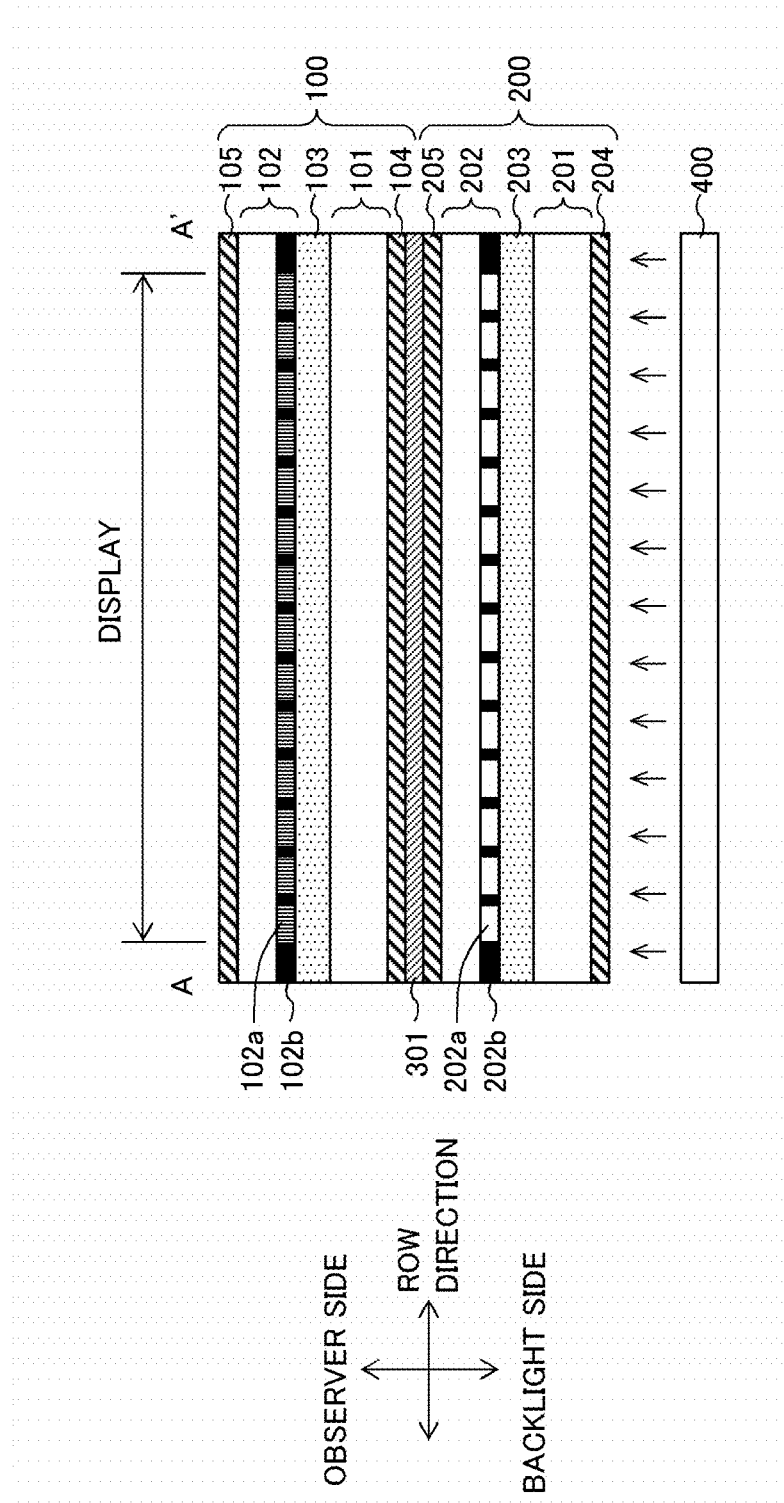
FIG. 4 is a sectional view taken along a line A-A' in FIGS. 2 and 3.

FIG. 2 is a plan view illustrating a schematic configuration of first display panel 100, and FIG. 3 is a plan view illustrating a schematic configuration of second display panel 200. FIG. 4 is a sectional view taken along a line A-A' in FIGS. 2 and 3.

A configuration of first display panel 100 will be described with reference to FIGS. 2 and 4. As illustrated in FIG. 4, first display panel 100 includes thin film transistor substrate 101 (hereinafter, referred to as a TFT substrate) disposed on the side of backlight 400, color filter substrate 102 (hereinafter, referred to as a CF substrate), which is disposed on the observer side while being opposite to TFT substrate 101, and liquid crystal layer 103 disposed between TFT substrate 101 and CF substrate 102. Polarizing plate 104 is disposed on the side of backlight 400 of first display panel 100, and polarizing plate 105 is disposed on the observer side.

In TFT substrate 101, as illustrated in FIG. 2, a plurality of data lines 111 extending in a first direction (for example, a column direction), a plurality of gate lines 112 extending in a second direction (for example, a row direction) different from the first direction are formed, and thin film transistor 113 (hereinafter, referred to as a TFT) is formed near an intersection between corresponding one of data lines 111 and corresponding one of gate lines 112. In planar view of first display panel 100, a region surrounded by two data lines 111 adjacent to each other and two gate lines 112 adjacent to each other is defined as one sub-pixel 114, and a plurality of sub-pixels 114 are arranged in a matrix form (in the row and column directions). The plurality of data lines 111 are disposed at equal intervals in the row direction, and the plurality of gate lines 112 are disposed at equal intervals in the column direction. In TFT substrate 101, pixel electrode 115 is formed in each sub-pixel 114, and one common electrode (not illustrated) common to the plurality of sub-pixels 114 is formed. A drain electrode constituting TFT 113 is electrically connected to data line 111, a source electrode constituting TFT 113 is electrically connected to pixel electrode 115, and a gate electrode constituting TFT 113 is electrically connected to gate line 112.

As illustrated in FIG. 4, a plurality of colored portions 102a each of which corresponds to sub-pixel 114 are formed on CF substrate 102. Each colored portion 102a is surrounded by black matrix 102b blocking light transmission. For example, each colored portion 102a is formed into a rectangular shape. The plurality of colored portions 102a include red portions made of a red (R color) material to transmit red light, green portions made of a green (G color) material to transmit green light, and blue portions made of a blue (B color) material to transmit blue light. One of the red portions, one of the green portions, and one of the blue portions are repeatedly arranged in this order in the row direction, the colored portions having the same color are arranged in the column direction, and black matrices 102b are formed in boundaries of colored portions 102a adjacent in the row and column directions. According to colored portions 102a, the plurality of sub-pixels 114 include red sub-pixels 114R corresponding to the red portions, green sub-pixels 114G corresponding to the green portions, and blue sub-pixels 114B corresponding to the blue portions as illustrated in FIG. 2. In first display panel 100, one pixel 124 is constructed with one red sub-pixel 114R, one green sub-pixel 114G, and one blue sub-pixel 114B, and a plurality of pixels 124 are arranged in a matrix form.

First timing controller 140 has a known configuration. For example, based on first image data DAT1 and first control signal CS1 (such as a clock signal, a vertical synchronizing signal, and a horizontal synchronizing signal), which are output from image processor 300, first timing controller 140 generates various timing signals (data start pulse DSP1, data clock DCK1, gate start pulse GSP1, and gate clock GCK1) to control first image data DA1 and drive of first source driver 120 and first gate driver 130 (see FIG. 2). First timing controller 140 outputs first image data DA1, data start pulse DSP1, and data clock DCK1 to first source driver 120, and outputs gate start pulse GSP1 and gate clock GCK1 to first gate driver 130.

First source driver 120 outputs a data signal (data voltage) corresponding to first image data DA1 to data lines 111 based on data start pulse DSP1 and data clock DCK1. First gate driver 130 outputs a gate signal (gate voltage) to gate lines 112 based on gate start pulse GSP1 and gate clock GCK1.

The data voltage is supplied from first source driver 120 to each data line 111, and the gate voltage is supplied from first gate driver 130 to each gate line 112. Common voltage $V_{com}$ is supplied from a common driver (not illustrated) to the common electrode. When the gate voltage (gate-on voltage) is supplied to gate line 112, TFT 113 connected to gate line 112 is turned on, and the data voltage is supplied to pixel electrode 115 through data line 111 connected to TFT 113. An electric field is generated by a difference between the data voltage supplied to pixel electrode 115 and common voltage $V_{com}$ supplied to the common electrode. The liquid crystal is driven by the electric field, and transmittance of backlight 400 is controlled, thereby displaying an image. In first display panel 100, the color image is displayed by supply of a desired data voltage to data line 111 connected to pixel electrode 115 of each of red sub-pixel 114R, green sub-pixel 114G, and blue sub-pixel 114B. A known configuration can be applied to first display panel 100.

Next, a configuration of second display panel 200 will be described below with reference to FIGS. 3 and 4. As illustrated in FIG. 4, second display panel 200 includes TFT substrate 201 disposed on the side of backlight 400, CF substrate 202, which is disposed on the observer side while being opposite to TFT substrate 201, and liquid crystal layer 203 disposed between TFT substrate 201 and CF substrate 202. Polarizing plate 204 is disposed on the side of backlight 400 of second display panel 200, and polarizing plate 205 is disposed on the observer side. Diffusion sheet 301 is disposed between polarizing plate 104 of first display panel 100 and polarizing plate 205 of second display panel 200.

Figure 5A:
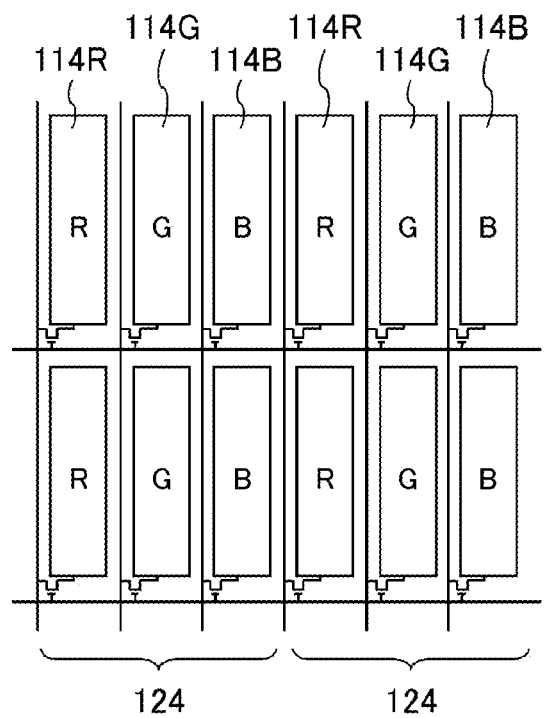
FIGS. 5A and 5B are plan views illustrating another example of pixel dispositions of the first and second display panels.
Figure 5B:
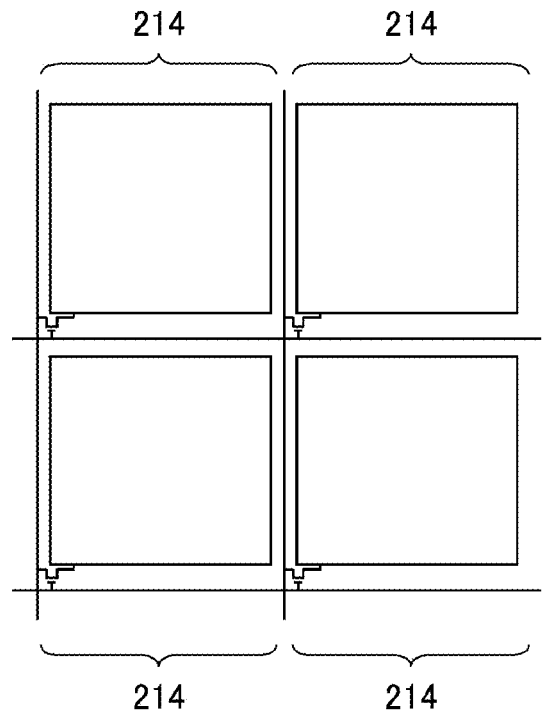

In TFT substrate 201, as illustrated in FIG. 3, a plurality of data lines 211 extending in the column direction, a plurality of gate lines 212 extending in the row direction are formed, and TFT 213 is formed near an intersection between corresponding one of data lines 211 and corresponding one of gate lines 212. In planar view of second display panel 200, a region surrounded by two data lines 211 adjacent to each other and two gate lines 212 adjacent to each other is defined as one pixel 214, and a plurality of pixels 214 are arranged in a matrix form (the row direction and the column direction). The plurality of data lines 211 are disposed at equal intervals in the row direction, and the plurality of gate lines 212 are disposed at equal intervals in the column direction. In TFT substrate 201, pixel electrode 215 is formed in each pixel 214, and one common electrode (not illustrated) common to the plurality of pixels 214 is formed. A drain electrode constituting TFT 213 is electrically connected to data line 211, a source electrode constituting TFT 213 is electrically connected to pixel electrode 215, and a gate electrode constituting TFT 213 is electrically connected to gate line 212. Sub-pixel 114 of first display panel 100 and pixel of second display panel 200 are disposed on one-to-one correspondence, and overlap each other in planar view. For example, red sub-pixel 114R, green sub-pixel 114G and blue sub-pixel 114B, which constitute pixel 124 in FIG. 2, and three pixels 214 in FIG. 3 overlap each other in planar view. As illustrated in FIGS. 5A and 5B, three sub-pixels 114 (red sub-pixel 114R, green sub-pixel 114G, and blue sub-pixel 114B) (see FIG. 5A) of first display panel 100 and one pixel 214 (see FIG. 5B) of second display panel 200 may overlap each other in planar view.

As illustrated in FIG. 4, in CF substrate 202, black matrix 202b blocking light transmission is formed at a position corresponding to a boundary of each pixel 214. The colored portion is not formed in region 202a surrounded by black matrix 202b. For example, an overcoat film is formed in region 202a.

Second timing controller 240 has a known configuration. For example, based on second image data DAT2 and second control signal CS2 (such as a clock signal, a vertical synchronizing signal, and a horizontal synchronizing signal), which are output from image processor 300, second timing controller 240 generates various timing signals (data start pulse DSP2, data clock DCK2, gate start pulse GSP2, and gate clock GCK2) to control second image data DA2 and drive of second source driver 220 and second gate driver 230 (see FIG. 3). Second timing controller 240 outputs second image data DA2, data start pulse DSP2, and data clock DCK2 to second source driver 220, and outputs gate start pulse GSP2 and gate clock GCK2 to second gate driver 230.

Second source driver 220 outputs the data voltage corresponding to second image data DA2 to data lines 211 based on data start pulse DSP2 and data clock DCK2. Second gate driver 230 outputs the gate voltage to gate lines 212 based on gate start pulse GSP2 and gate clock GCK2.

The data voltage is supplied from second source driver 220 to each data line 211, and the gate voltage is supplied from second gate driver 230 to each gate line 212. Common voltage $V_{com}$ is supplied from the common driver to the common electrode. When the gate voltage (gate-on voltage) is supplied to gate line 212, TFT 213 connected to gate line 212 is turned on, and the data voltage is supplied to pixel electrode 215 through data line 211 connected to TFT 213. An electric field is generated by a difference between the data voltage supplied to pixel electrode 215 and common voltage $V_{com}$ supplied to the common electrode. The liquid crystal is driven by the electric field, and transmittance of backlight 400 is controlled, thereby displaying an image. The monochrome image is displayed on second display panel 200. A known configuration can be applied to second display panel 200.

First Exemplary Embodiment

Figure 6:
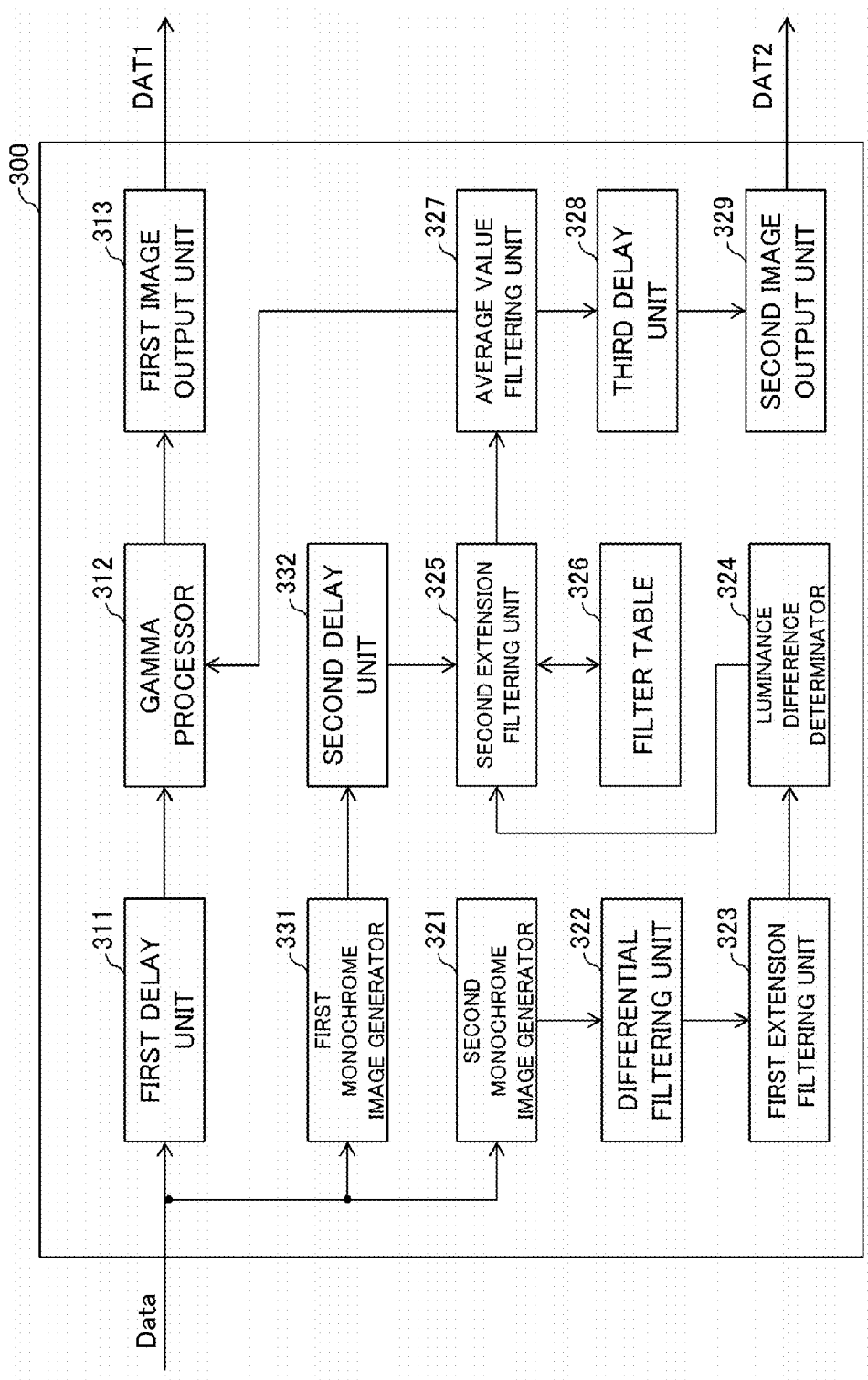
FIG. 6 is a block diagram illustrating a specific configuration of an image processor according to a first exemplary embodiment.

FIG. 6 is a block diagram illustrating a specific configuration of image processor 300 according to a first exemplary embodiment. Image processor 300 includes first delay unit 311, gamma processor 312, first image output unit 313, first monochrome image generator 331, second delay unit 332, second monochrome image generator 321, differential filtering unit 322, first extension filtering unit 323, luminance difference determinator 324, second extension filtering unit 325, filter table 326, average value filtering unit 327, third delay unit 328, and second image output unit 329. Image processor 300 performs the following image processing based on input video signal Data, and generates first image data DAT1 (color image data) for first display panel 100 and second image data DAT2 (monochrome image data) for second display panel 200.

When receiving input video signal Data transmitted from the external system, image processor 300 transfers input video signal Data to first delay unit 311, first monochrome image generator 331, and second monochrome image generator 321. For example, input video signal Data includes luminance information (gray-scale information) and color information. The color information is one designating the color. For example, in a case that input video signal Data is configured with 8 bits, each of a plurality of colors including the R color, the G color, and the B color can be expressed by values of 0 to 255. The plurality of colors include at least the R color, the G color, and the B color, and may further include a W (white) color and/or a Y (yellow) color. The case that the plurality of colors include the R color, the G color, and the B color is cited below by way of example. Hereinafter, the color information about input video signal Data is referred to as an RGB value ([R value, G value, B value]). For example, in the case that the color corresponding to input video signal Data is white, the value (R value) of the R color is expressed by [255], the value (G value) of the G color is expressed by [255], and the value (B value) of the B color is expressed by [255]. That is, the RGB value is expressed by [255, 255, 255]. The RGB value is expressed by [255, 0, 0] in the case that the color corresponding to input video signal Data is red, and the RGB value is expressed by [0, 0, 0] in the case that the color is black.

Figure 7A:
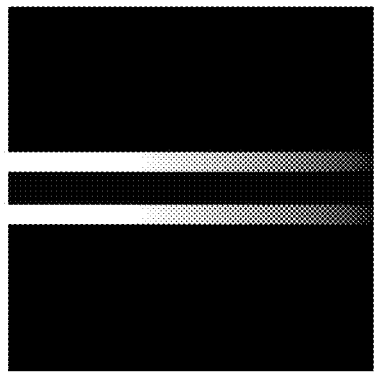
FIGS. 7A to 7C are views illustrating examples of images generated through each piece of processing of the image processor.

Image A in FIG. 7A is an example of an image (input image) corresponding to input video signal Data. When obtaining input video signal Data, first monochrome image generator 331 generates monochrome image data (hereinafter, referred to as first monochrome image data) corresponding to the monochrome image using a maximum value (the R value, the G value, or the B value) in each color value (in this case, RGB value [R value, G value, B value]) indicating the color information about input video signal Data. Specifically, first monochrome image generator 331 generates the first monochrome image data by setting the maximum value in the RGB value corresponding to each pixel 214 as the value of said pixel 214. First monochrome image generator 331 outputs the generated first monochrome image data to second delay unit 332.

When obtaining input video signal Data, second monochrome image generator 321 generates monochrome image data (hereinafter, referred to as second monochrome image data) corresponding to the monochrome image using luminance signal Y of input video signal Data. Specifically, second monochrome image generator 321 calculates luminance signal Y from the RGB value ([R value, G value, B value]) of input video signal Data, and generates the second monochrome image data based on luminance signal Y. For example, luminance signal Y can be calculated using the following known transform (1).

$$Y=0.299\times R \text{ value}+0.587\times G \text{ value}+0.114\times B \text{ value} \quad (1)$$

Figure 7B:
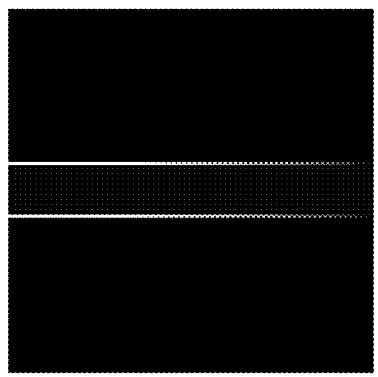
Figure 8A:
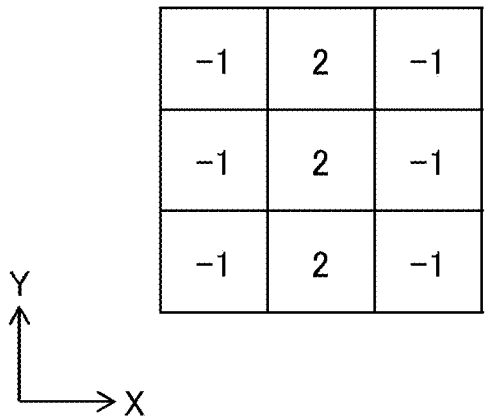
FIGS. 8A and 8B are views illustrating examples of operators used in differential filtering.
Figure 8B:
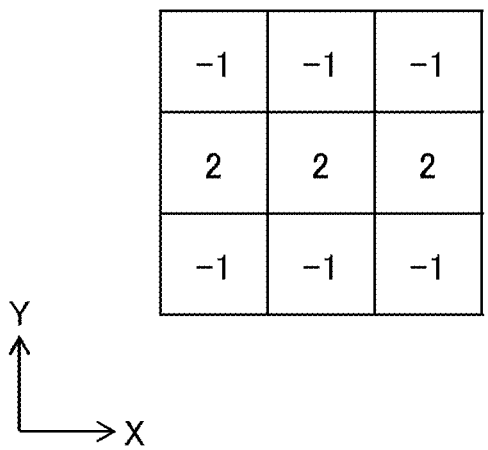

When obtaining the second monochrome image data from second monochrome image generator 321, differential filtering unit 322 performs differential filtering (edge detection processing) on the second monochrome image data to detect (emphasize) a boundary (edge) at which luminance changes largely. For example, differential filtering unit 322 performs the differential filtering using a Prewitt filter or a Sobel filter. For example, differential filtering unit 322 performs the differential filtering with the Prewitt filter in which an operator in an X-axis (horizontal) direction in FIG. 8A and an operator in a Y-axis (vertical) direction in FIG. 8B are used. The differential filtering deletes a low-frequency component, so that the edge at which the luminance changes largely can be emphasized. Image B in FIG. 7B is an image generated through the differential filtering. The operators used in the differential filtering are not limited to the operators in FIGS. 8A and 8B. A known method can be adopted as the differential filtering.

Figure 7C:
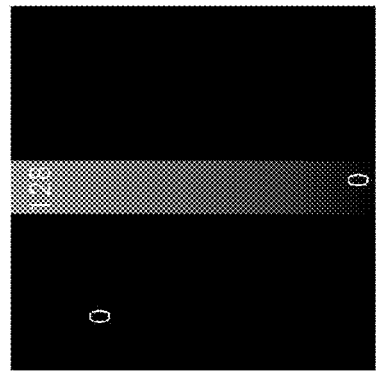

When obtaining the second monochrome image data subjected to the differential filtering, first extension filtering unit 323 performs extension filtering (first extension filtering) on the second monochrome image data to extend a high-luminance region with a filter size common to all the pixels in each frame. For example, using a 19-by-19 pixel region constructed with each nine pixels on the right, left, top, and bottom around pixel 214 (target pixel) as the filter size, first extension filtering unit 323 performs processing of setting the maximum luminance in the filter size to the luminance of the pixel (target pixel). Although the filter size is not limited to the 19-by-19 pixel region, all the pixels 214 are set to the common filter size in each frame. The filter is not limited to a square shape, but the filter may be formed into a circular shape. Image C in FIG. 7C is an image generated through the first extension filtering. As can be seen from FIG. 7C, the high-luminance region of image B in FIG. 7B extends with an identical width. A known method can be adopted as the first extension filtering.

When obtaining the second monochrome image data subjected to the first extension filtering, luminance difference determinator 324 determines a difference in luminance (luminance difference) at the boundary of the luminance in the second monochrome image data. In image C of FIG. 7C, the luminance difference increases toward an upper side in FIG. 7C, and the luminance difference decreases toward a lower side in FIG. 7C. Luminance difference determinator 324 outputs a determination result (luminance difference) to second extension filtering unit 325. In the case that input video signal Data is configured with 8 bits, the luminance difference is expressed by gray scales of 0 to 255 steps.

Second delay unit 332 outputs the first monochrome image data obtained from first monochrome image generator 331 to second extension filtering unit 325 in synchronization with output timing of the determination result (luminance difference) of luminance difference determinator 324.

When obtaining the first monochrome image data and the determination result (luminance difference) from second delay unit 332 and luminance difference determinator 324, respectively, second extension filtering unit 325 performs extension filtering (second extension filtering) on first monochrome image data to extend the high-luminance region based on the luminance difference.

Figure 10:
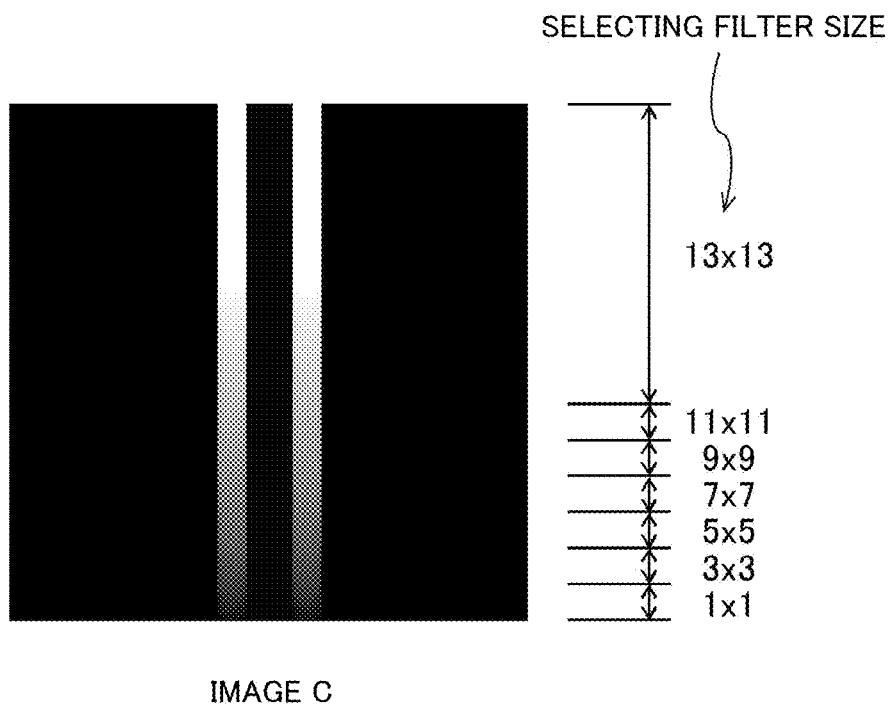
FIG. 10 is a view illustrating an example of a filter size selected based on second monochrome image data.

Specifically, second extension filtering unit 325 first refers to filter table 326 to select the filter size corresponding to the determination result (luminance difference) decided by luminance difference determinator 324. In filter table 326, the gray scales of 0 to 255 steps is classified into a plurality of levels as the luminance difference, and each filter size corresponding to its level is stored. FIG. 9 is a view illustrating an example of filter table 326 (LUT). In FIG. 9, the gray scales of 0 to 255 steps is classified into seven levels as the luminance difference, and each filter size corresponding to its level is stored. In filter table 326, the filter size is reduced with decreasing luminance difference, and the filter size is enlarged with increasing luminance difference. In the example of image C in FIG. 7C, as illustrated in FIG. 10, a 13-by-13 pixel region is selected as the filter size in a top portion where the luminance difference becomes the maximum, and the filter size that is reduced toward a bottom region where the luminance difference decreases is selected. A 1-by-1 pixel region is selected as the filter size near a bottom portion (gray scales of 0 to 15 steps) having the small luminance difference.

Then, second extension filtering unit 325 performs extension filtering (second extension filtering) on the first monochrome image data obtained from second delay unit 332 to extend the high-luminance region with the selected filter size. That is, second extension filtering unit 325 performs the processing of setting the maximum luminance in the selected filter size as luminance of target pixel 214, on each pixel 214. FIG. 11A illustrates image D corresponding to the first monochrome image data and the selected filter size (see FIG. 10) with which the second extension filtering is performed on image D, and image D in FIG. 11B is an image generated through the second extension filtering. According to the second extension filtering, as illustrated in FIG. 11B, the high-luminance region extends as a whole, the high-luminance region extends toward the upper region having the large luminance difference, and the high-luminance region is reduced toward the lower region having the small luminance difference. Near the bottom portion (gray scales of 0 to 15 steps) having the small luminance difference, the same image as the image (high-luminance region width) in FIG. 10 is obtained because the second extension filtering is performed with the 1-by-1 pixel region as the filter size. In the case that the 1-by-1 pixel region is selected as the filter size, second extension filtering unit 325 may need not perform the second extension filtering (second extension filtering is stopped).

Figure 12:
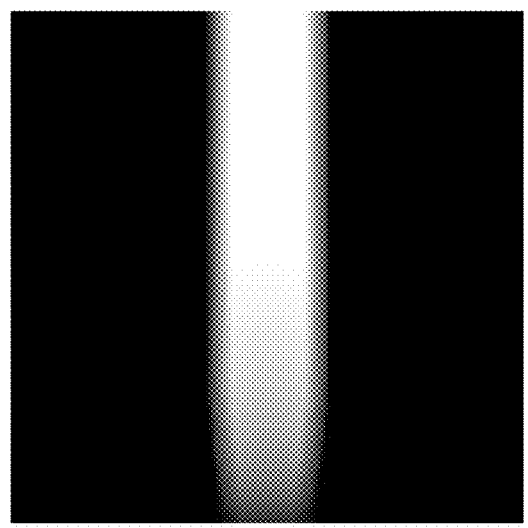
FIG. 12 is a view illustrating an example of an image generated through smoothing of the image processor.

When obtaining the first monochrome image data subjected to the second extension filtering, average value filtering unit 327 performs smoothing on the first monochrome image data using an average value filter common to all pixels 214 in each frame. For example, using the 19-by-19 pixel region constructed with each nine pixels on the right, left, top, and bottom around pixel 214 (target pixel) as the filter size, average value filtering unit 327 performs processing of setting the average luminance in the filter size as the luminance of target pixel 214, on each pixel 214. Although the filter size is not limited to the 19-by-19 pixel region, all the pixels 214 are set to the common filter size in each frame. The filter is not limited to a square shape, but the filter may be formed into a circular shape. The smoothing deletes a high-frequency component, so that the luminance change can be smoothed. Image F in FIG. 12 is an image generated through the smoothing. As can be seen from FIG. 12, the boundary (contour) of the luminance in image E of FIG. 11 becomes blurred, and the luminance change is smoothed. Average value filtering unit 327 outputs the first monochrome image data subjected to the smoothing to gamma processor 312 and third delay unit 328.

Based on the first monochrome image data obtained from average value filtering unit 327, gamma processor 312 performs gamma processing on input video signal Data obtained from first delay unit 311 to display the color image on first display panel 100. For example, gamma processor 312 sets a gamma value of the color image such that a display image in which the monochrome image and the color image are combined with each other has a combination gamma value of 2.2. Gamma processor 312 outputs the color image data subjected to the gamma processing to first image output unit 313.

Third delay unit 328 outputs the first monochrome image data subjected to the smoothing to second image output unit 329 in synchronization with output timing of the color image data of the gamma processor 312.

First image output unit 313 outputs the color image data as first image data DAT1 to first timing controller 140, and second image output unit 329 outputs the first monochrome image data as second image data DAT2 to second timing controller 240. Image processor 300 outputs first control signal CS1 to first timing controller 140, and outputs second control signal CS2 to second timing controller 240 (see FIGS. 2 and 3).

Figure 13:
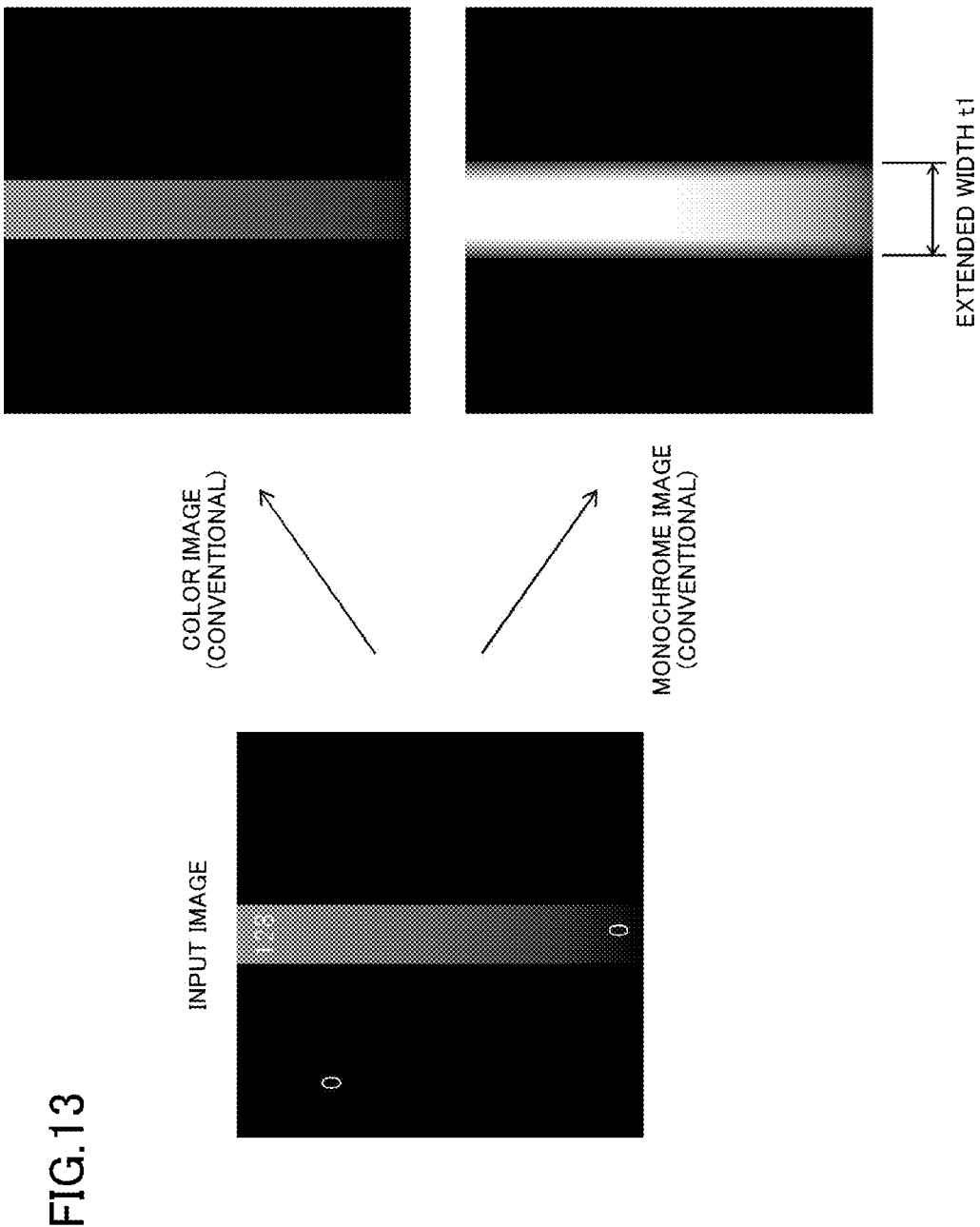
FIG. 13 is a view illustrating an example of images displayed on the first and second display panels in a conventional configuration.
Figure 14:
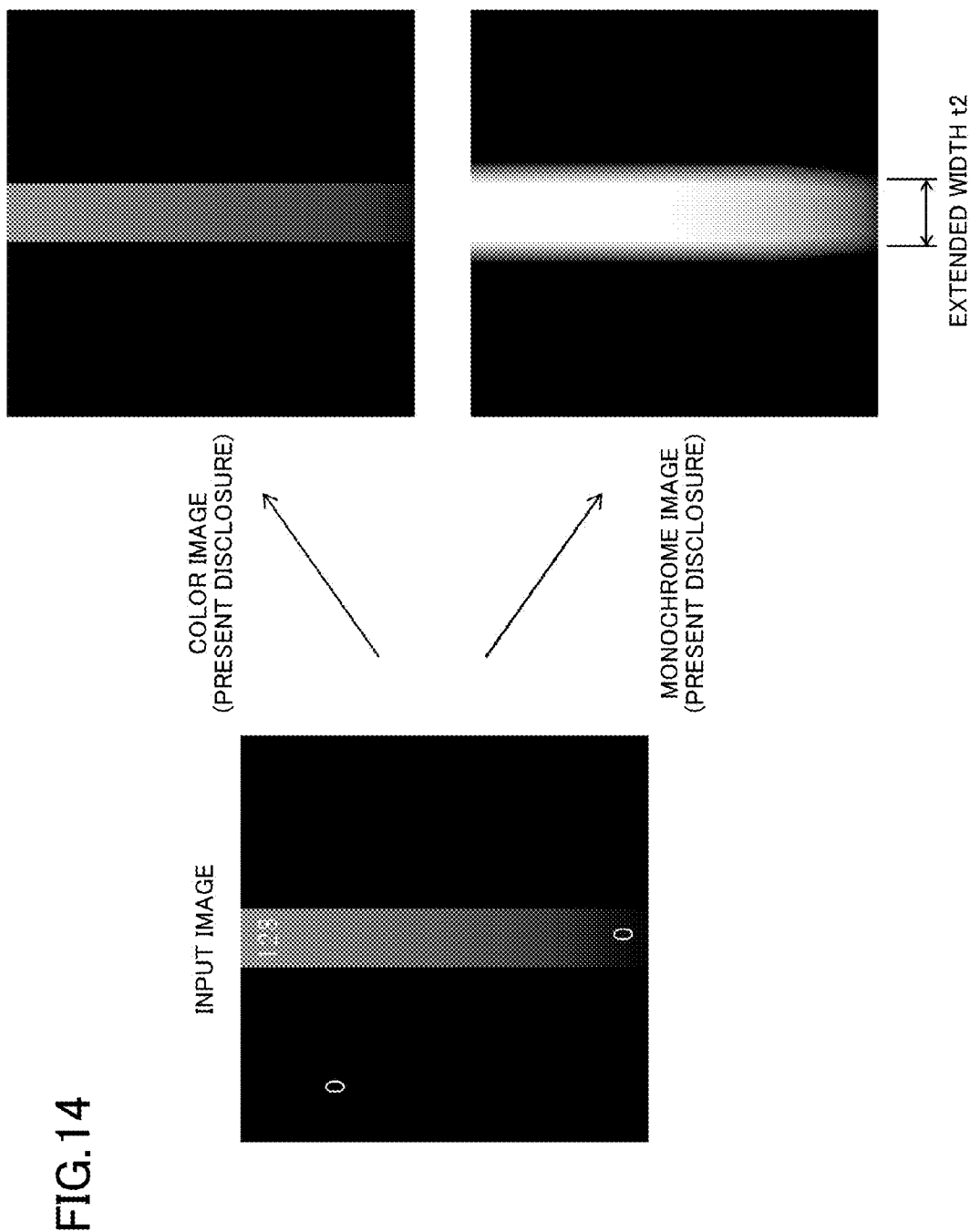
FIG. 14 is a view illustrating an example of images displayed on the first and second display panels in the configuration of the first exemplary embodiment.

Thus, in the configuration of image processor 300 according to the present exemplary embodiment, particularly second extension filtering unit 325 changes the filter size according to the luminance difference of the image (monochrome image) to perform the extension filtering (second extension filtering). FIG. 13 illustrates an image (color image) displayed on a first display panel and an image (monochrome image) displayed on a second display panel in a conventional configuration. FIG. 14 illustrates an image (color image) displayed on first display panel 100 and an image (monochrome image) displayed on second display panel 200 in the configuration according to the present exemplary embodiment. As can be seen from FIGS. 13 and 14, in the configuration according to the present exemplary embodiment, compared with the conventional configuration, an extended width of the high-luminance region in low-gray scale region (the lower region in FIGS. 13 and 14) of the monochrome image is gradually narrowed (t2<t1) with decreasing luminance difference. Therefore, in the configuration according to the present exemplary embodiment, the extended width of the high-luminance region is narrowed particularly in the low-gray scale region, so that appearance of the image having the black-floating level can be suppressed in the dark region where the black-floating level can be generated in the conventional configuration. Additionally, a flare occurring in a bright-spot-shaped image can largely be reduced by a dynamic change of the extension filter size in a medium region between a perceptible luminance difference and an imperceptible luminance difference.

At this point, although the luminance difference depends on the color, the colors are not distinguished from each other in the method in which the monochrome image is formed using the maximum value of the RGB value. Therefore, for example, in the case that the image includes the white and red colors, the extension filter relatively strongly affects the region corresponding to the red portion. Resultantly, there is a risk that the black-floating level occurs in the red region. Particularly, in the case that the image is obliquely viewed, there is a risk of notably visually recognizing the black-floating level. On the other hand, in the present exemplary embodiment, luminance signal Y is calculated from the RGB value, the monochrome image (second monochrome image data) is generated based on luminance signal Y, and the differential filtering is performed on the monochrome image. Therefore, because the luminance difference decreases in the region corresponding to the red portion, the filter size selected in second extension filtering unit 325 is reduced with respect to regions surrounding the region corresponding to the red portion. For example, in the case that the target pixel corresponds to the white (highest luminance) while the pixels around the target pixel correspond to the red (highest luminance), second extension filtering unit 325 performs the second extension filtering using the smaller filter size compared with the case that the target pixel corresponds to the white (highest luminance) while the pixels around the target pixel correspond to the white (highest luminance). Therefore, the luminance is kept low in the region corresponding to the red portion in the monochrome image, so that the black-floating level can be improved.

Second Exemplary Embodiment

A second exemplary embodiment of the present disclosure will be described below with reference to the drawings. For convenience, the same component as that of the first exemplary embodiment is designated by the same numeral, and the description will be omitted. In the second exemplary embodiment, the term defined in the first exemplary embodiment is used according to the definition of the first exemplary embodiment unless otherwise noted.

In liquid crystal display device 10 according to the second exemplary embodiment, based on characteristics such as a format of the video signal, the gamma value, and the luminance, second extension filtering unit 325 performs the extension filtering (second extension filtering) on the first monochrome image data to extend the high-luminance region. A specific configuration of image processor 300 according to the second exemplary embodiment will be described below.

Figure 15:
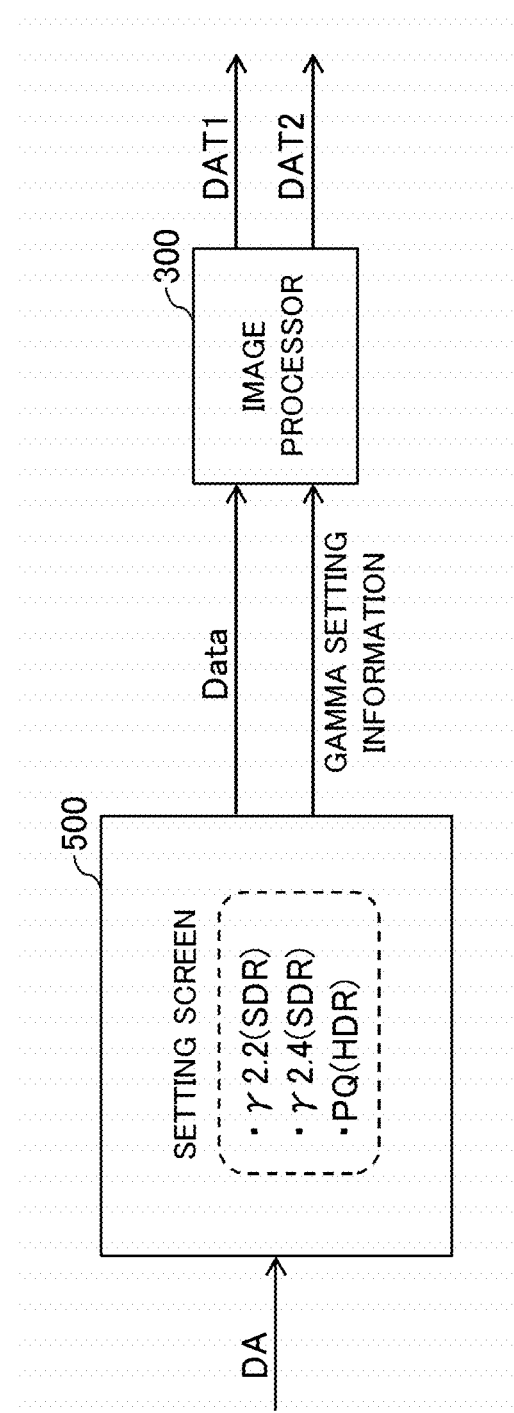
FIG. 15 is a view illustrating an example of data input to an image processor according to a second exemplary embodiment.

FIG. 15 is a view illustrating an example of data input to image processor 300 according to the second exemplary embodiment. System 500 provided outside liquid crystal display device 10 receives video signal DA having a predetermined format from a signal source. For example, system 500 performs processing of converting video signal DA into a video (input video signal Data) according to the characteristic of the display panels (first display panel 100 and second display panel 200). A user such as a system manager and an observer sets a desired gamma value on a setting screen of system 500. For example, on the setting screen of system 500, the user may set the gamma value according to the characteristic of video signal DA, set the gamma value according to display characteristics of first display panel 100 and second display panel 200, or set the gamma value according to another parameter. FIG. 15 illustrates an example of the gamma value setting screen. For example, the user selects one of "γ2.2", "γ2.4", and "Perceptual Quantizer (PQ)" on the setting screen. System 500 outputs input video signal Data and the set information (gamma setting information) to image processor 300.

Figure 16:
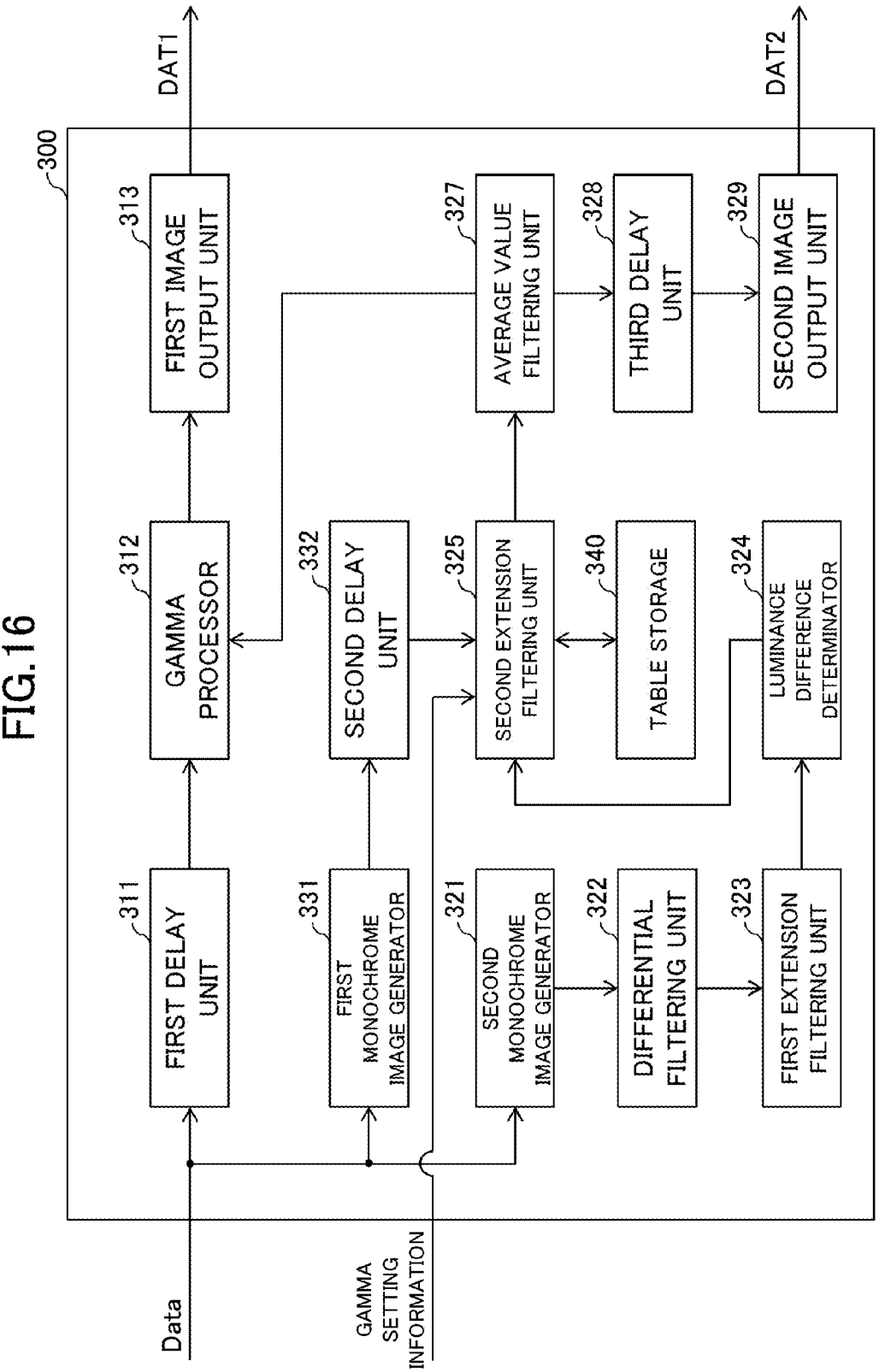
FIG. 16 is a block diagram illustrating a specific configuration of the image processor according to the second exemplary embodiment.

FIG. 16 is a block diagram illustrating a specific configuration of image processor 300 according to the second exemplary embodiment. Second extension filtering unit 325 obtains the gamma setting information corresponding to input video signal Data from system 500. When obtaining the gamma setting information, second extension filtering unit 325 selects a filter table corresponding to the gamma setting information from a plurality of filter tables stored in table storage 340. FIG. 17 illustrates two filter tables (first and second filter tables) stored in table storage 340. For example, the first filter table in FIG. 17A is set such that the extension filtering (second extension filtering) is turned off when the determination result (luminance difference) of luminance difference determinator 324 is less than the 16-step gray scale, and the second filter table in FIG. 17B is set such that the extension filtering (second extension filtering) is turned off when the luminance difference is less than the 48-step gray scale. That is, the gray scale (threshold) at which the second extension filtering is switched between on and off is set to the 16-step gray scale in the first filter table, and set to the 48-step gray scale in the second filter table. In the first and second filter tables, the filter size of the 1-by-1 pixel region (one pixel) is set in the region where the second extension filtering becomes off. In the first and second filter tables, the filter size of the 13-by-13 pixel region is set in the region where the second extension filtering becomes on and the luminance difference becomes the maximum, and the smaller filter size is set with decreasing luminance difference.

Second extension filtering unit 325 refers to the selected filter table (for example, the first filter table or the second filter table) to select the filter size corresponding to the luminance difference, and performs the second extension filtering using the selected filter size. The subsequent pieces of processing are similar to those of image processor 300 according to the first exemplary embodiment.

In the configuration according to the second exemplary embodiment, for example, in the case that the characteristic of video signal DA is the gamma value of 2.2 in a standard dynamic range (SDR) video, second extension filtering unit 325 refers to the first filter table to perform the second extension filtering. In the case that the characteristic of video signal DA is a gamma curve characteristic of a PQ curve in a high dynamic range (HDR) video, second extension filtering unit 325 refers to the second filter table to perform the second extension filtering. At this point, because the HDR video is larger than the SDR video in a luminance width (dynamic range), when the second extension filtering is performed on the HDR video with reference to the first filter table, the luminance increases in the dark region, and the image having the black-floating level or a noise image is easily visually recognized. On the other hand, in the configuration of the second exemplary embodiment, for the SDR video and HDR video having the same original image, while the second extension filtering is performed on the regions of the gray scales of 16 steps to 47 steps in the SDR video (see FIG. 17A), the second extension filtering is not performed on the regions of the gray scales of 0 to 47 steps in the HDR video (see FIG. 17B). Therefore, the appearance of the image having the black-floating level or the noise image, which is possibly visually recognized in the HDR video, can be suppressed. Thus, in the configuration of the second exemplary embodiment, the appearance of the image having the black-floating level can properly be suppressed according to the characteristic of video signal DA.

Figure 18:
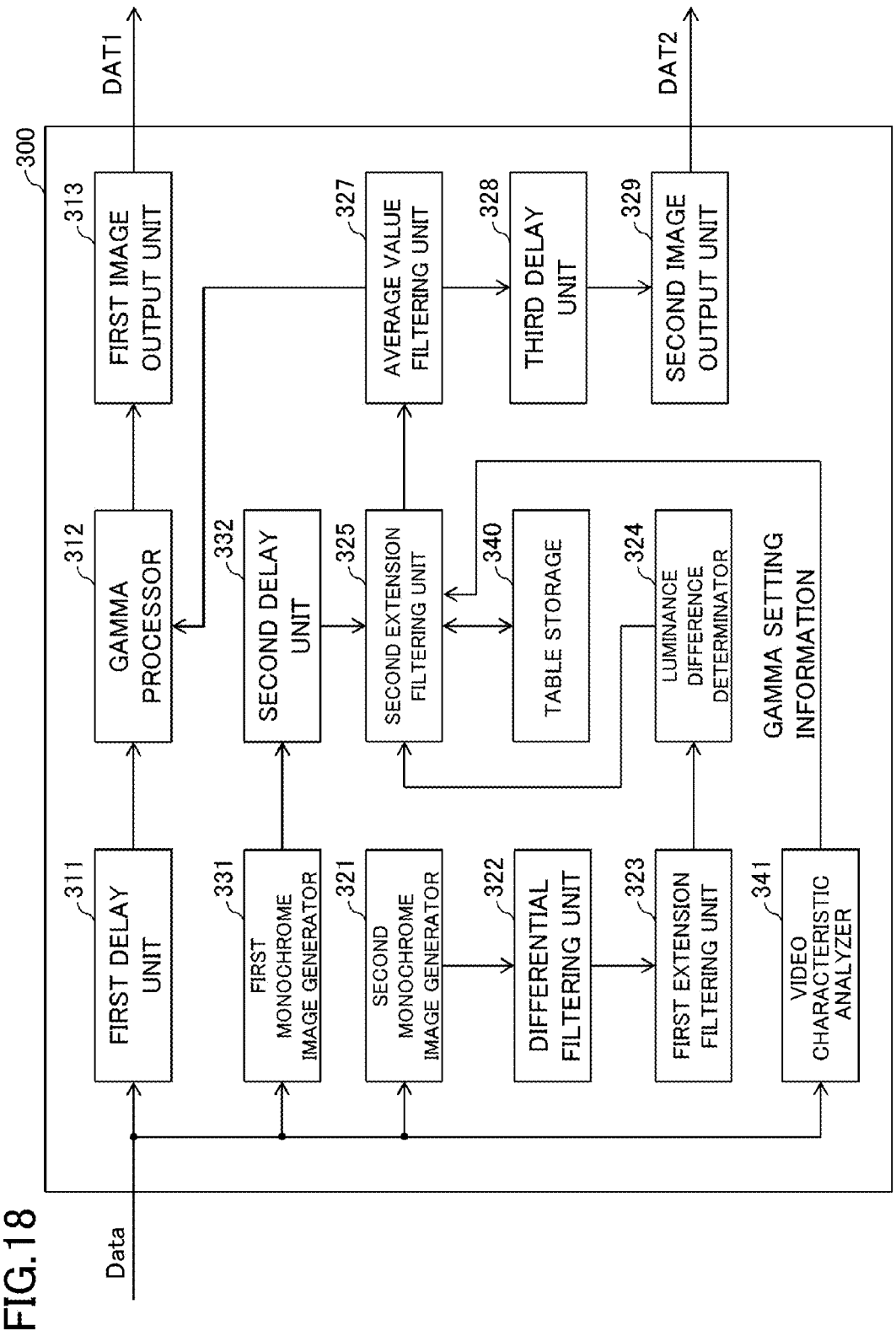
FIG. 18 is a block diagram illustrating a first modification of the image processor according to the second exemplary embodiment.

In the configuration of the second exemplary embodiment, second extension filtering unit 325 of image processor 300 obtains the gamma setting information output from system 500, and selects the filter table based on the gamma setting information. However, image processor 300 is not limited to the configuration of the second exemplary embodiment. FIG. 18 is a block diagram illustrating a specific configuration of image processor 300 according to a first modification. Image processor 300 according to the first modification further includes video characteristic analyzer 341 in addition to each unit of image processor 300 according to the first exemplary embodiment. Video characteristic analyzer 341 may receive input video signal Data output from system 500, analyze the characteristic of input video signal Data, and obtain the gamma setting information. In this case, second extension filtering unit 325 obtains the gamma setting information from video characteristic analyzer 341.

Figure 19:
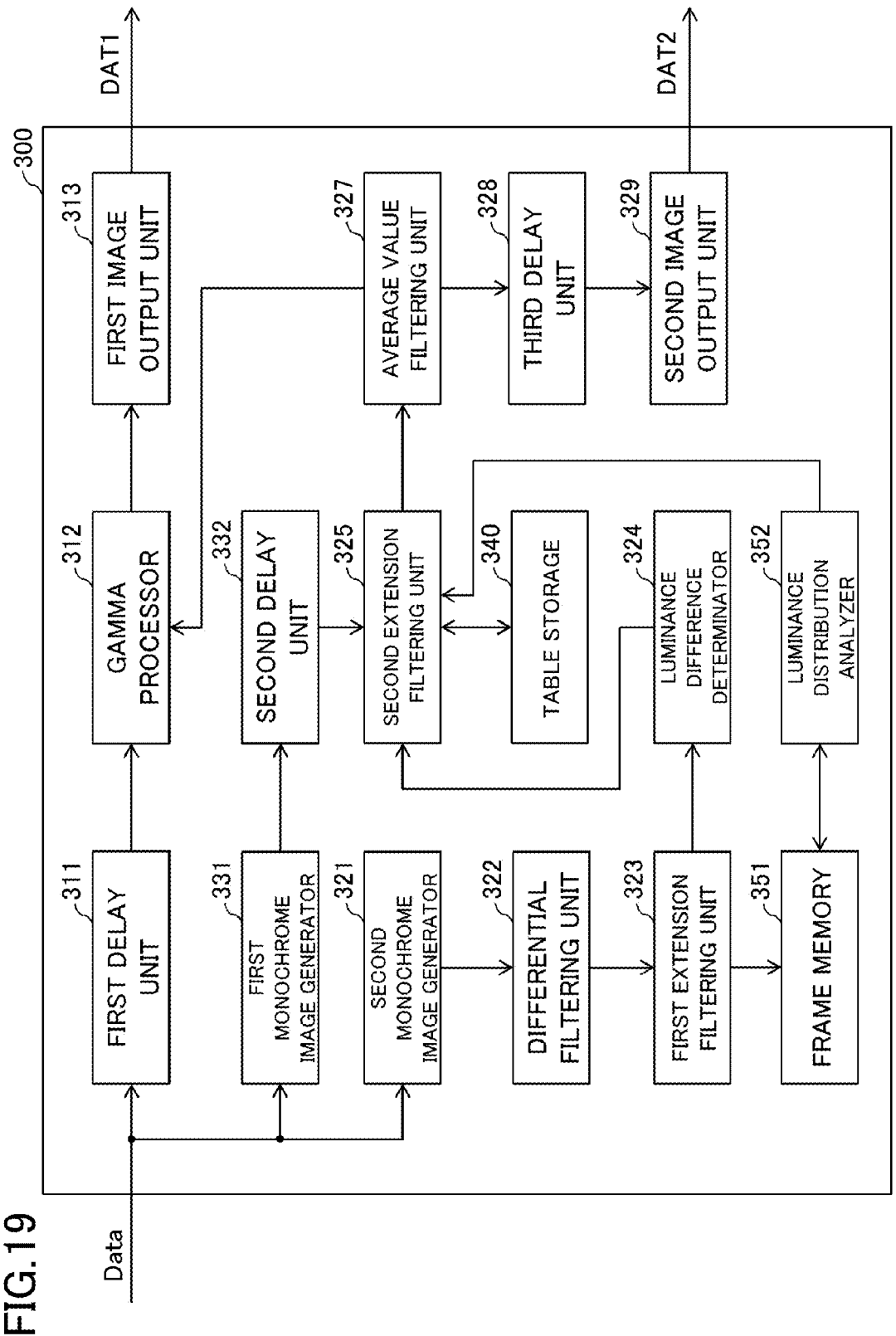
FIG. 19 is a block diagram illustrating a second modification of the image processor according to the second exemplary embodiment.
Figure 20A:
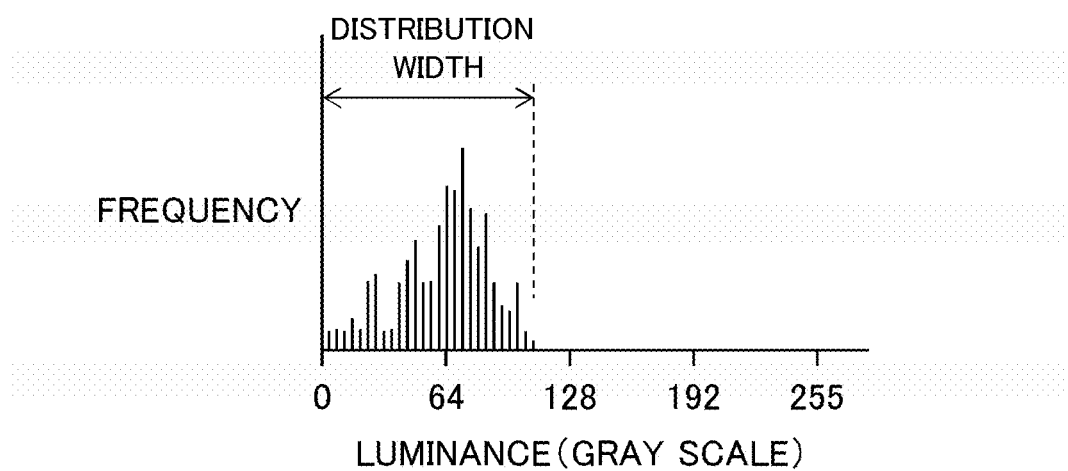
FIGS. 20A and 20B are views illustrating histograms of luminance differences in images after first extension filtering.
Figure 20B:
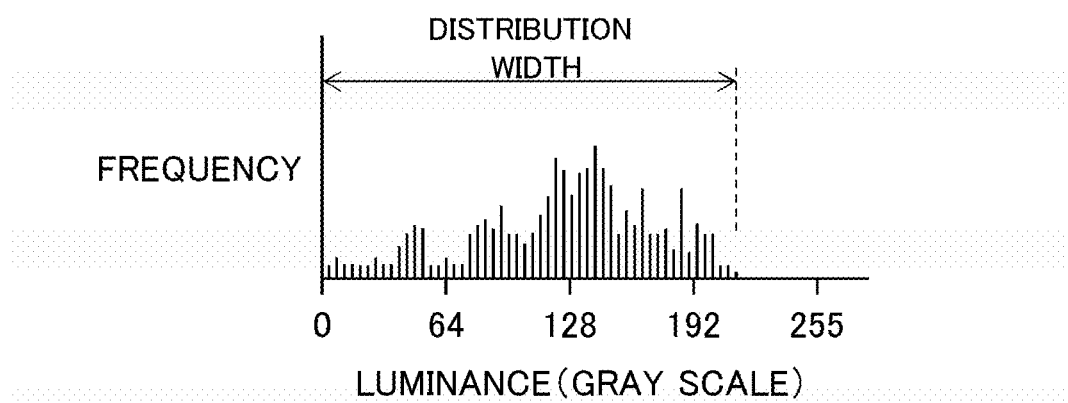

FIG. 19 is a block diagram illustrating a specific configuration of image processor 300 according to a second modification. Image processor 300 according to the second modification further includes frame memory 351 and luminance distribution analyzer 352 in addition to each unit of image processor 300 according to the first exemplary embodiment. The image, which is generated through the first extension filtering performed with first extension filtering unit 323 (see FIG. 7C), is stored in frame memory 351 for each one frame. Luminance distribution analyzer 352 generates a luminance distribution (histogram) of the image stored in frame memory 351, and detects a feature of the luminance distribution. For example, luminance distribution analyzer 352 detects a distribution width of the luminance distribution. FIG. 20A illustrates a luminance distribution in the image that is subjected to the first extension filtering based on the SDR video, and FIG. 20B illustrates a luminance distribution in the image that is subjected to the first extension filtering based on the HDR video. FIGS. 20A and 20B illustrate the case of the same original image. Luminance distribution analyzer 352 outputs a detection result to second extension filtering unit 325 when detecting the distribution width of the luminance distribution.

When obtaining the detection result (distribution width information), second extension filtering unit 325 selects the filter table corresponding to the distribution width from the plurality of filter tables (see FIG. 17) stored in table storage 340. Second extension filtering unit 325 refers to the selected filter table (the first filter table or the second filter table) to select the filter size corresponding to the luminance difference, and performs the second extension filtering using the selected filter size. For example, in the case that the distribution width is narrower than a threshold, second extension filtering unit 325 selects the first filter table, and refers to the first filter table to perform the second extension filtering. In the case that the distribution width is wider than the threshold, second extension filtering unit 325 selects the second filter table, and refers to the second filter table to perform the second extension filtering.

Luminance distribution analyzer 352 may detect a frequency peak value in the luminance distribution as the feature of the luminance distribution, or detect an average value of the luminance distribution as the feature of the luminance distribution. In this case, second extension filtering unit 325 may select the filter table based on the frequency peak value or the average value.

Figure 21:
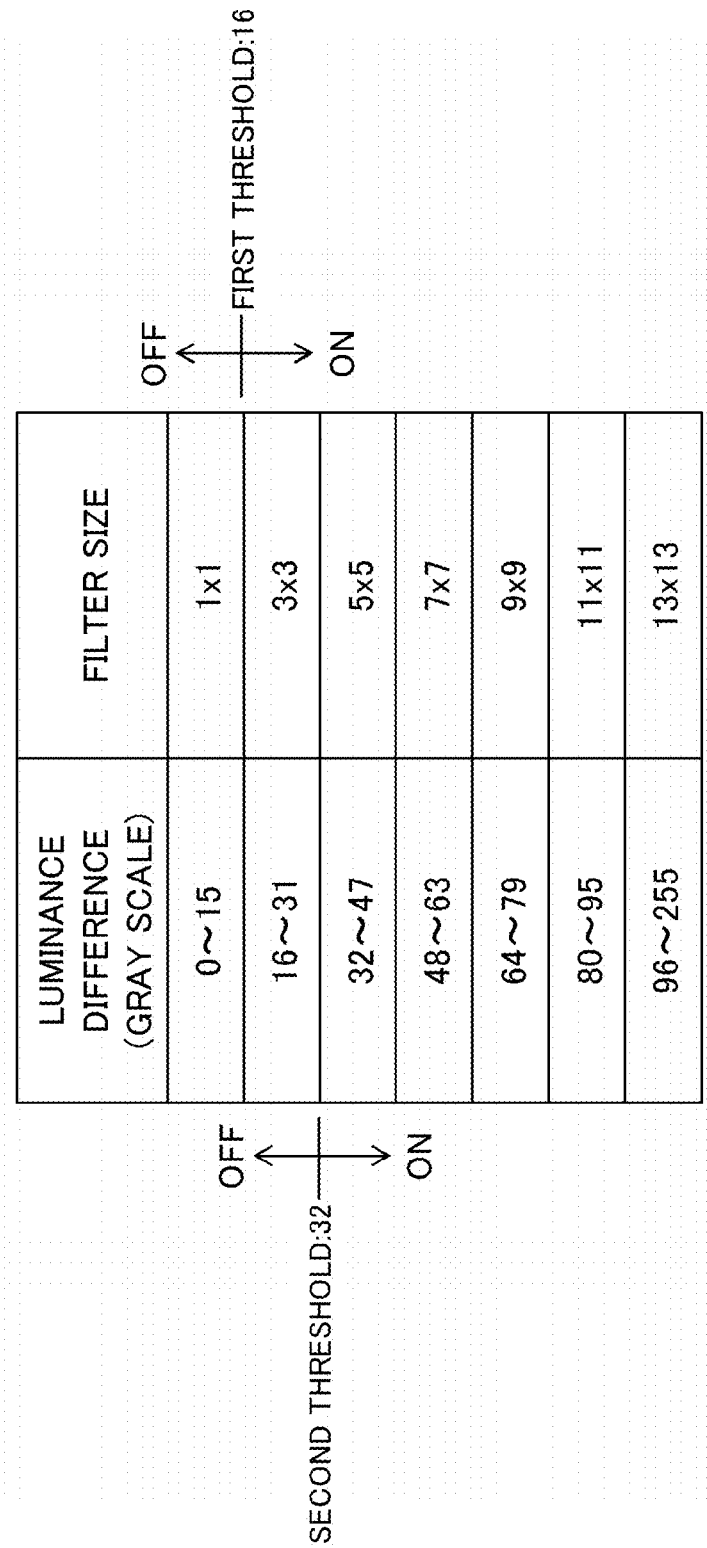
FIG. 21 is a view illustrating another example of the filter table according to the second exemplary embodiment.

Liquid crystal display device 10 according to the second exemplary embodiment is not limited to the above configuration. For example, in liquid crystal display device 10 according to a third modification, a plurality of thresholds at each of which the second extension filtering is switched between on and off may be set in one filter table. For example, a first threshold and a second threshold are set in a filter table of FIG. 21. In this case, for example, in the case that the characteristic of video signal DA is the gamma value of 2.2 in the SDR video, second extension filtering unit 325 refers to the filter table using the first threshold (16-step gray scale), and performs the second extension filtering. That is, in the case that the luminance difference is less than the 16-step gray scale, second extension filtering unit 325 puts the second extension filtering into off. On the other hand, in the case that the characteristic of video signal DA has the gamma curve characteristic of the PQ curve in the HDR video, second extension filtering unit 325 refers to the filter table using the second threshold (32-step gray scale), and performs the second extension filtering. That is, in the case that the luminance difference is less than the 32-step gray scale, second extension filtering unit 325 puts the second extension filtering into off. The second extension filtering is performed using the filter size of the same filter table (see FIG. 21) in the case that the luminance difference is greater than or equal to the 16-step gray scale in the SDR video and in the case that the luminance difference is greater than or equal to the 32-step gray scale in the HDR video.

In the above, the specific embodiments of the present application have been described, but the present application is not limited to the above-mentioned embodiments, and various modifications may be made as appropriate without departing from the spirit of the present application.

What is claimed is:

1. A liquid crystal display device in which a plurality of display panels are disposed while overlapping each other, an image being displayed on each of the display panels,
the liquid crystal display device comprising:
a first display panel displays a color image;
a second display panel that is disposed farther away from the observer than the first display panel is and displays a monochrome image; and
an image processor that generates first image data corresponding to the color image and second image data corresponding to the monochrome image based on an input video signal,
wherein
the image processor includes:
an extension filtering unit that performs extension filtering on first monochrome image data, which is made monochrome using a maximum value in a value of each color expressing color information included in the input video signal, to set maximum luminance in a filter size as luminance of a target pixel with a region constructed with the target pixel and pixels around the target pixel as the filter size; and
a luminance difference determinator that determines a luminance difference in second monochrome image data, which is made monochrome using a luminance signal calculated based on the value of each color expressing the color information, and
when the monochrome image corresponding to the second monochrome image data includes a first region having a first luminance difference and a second region having a second luminance difference smaller than the first luminance difference, the extension filtering unit performs the extension filtering on the first monochrome image data using a filter size constructed with a first number of pixels in a region corresponding to the first region, and performs the extension filtering on the first monochrome image data using a filter size constructed with a second number of pixels smaller than the first number of pixels in a region corresponding to the second region.

2. The liquid crystal display device according to claim 1, wherein
the extension filtering unit performs the extension filtering using the filter size that becomes smaller with decreasing luminance difference.

3. The liquid crystal display device according to claim 1, further comprising
a table in which a luminance difference classified into a plurality of levels and a filter size corresponding to each of the levels are stored while associated with each other,
wherein
the extension filtering unit refers to the table to select the filter size corresponding to the luminance difference.

4. The liquid crystal display device according to claim 1, wherein
when the target pixel corresponds to white while pixels around the target pixel correspond to red, the extension filtering unit performs the extension filtering using a larger filter size compared with a case that the target pixel corresponds to the white while the pixels around the target pixel correspond to the white.

5. The liquid crystal display device according to claim 1, wherein
the image processor performs differential filtering based on the luminance signal in order to detect a boundary at which the luminance changes in the second monochrome image data.

6. The liquid crystal display device according to claim 5, wherein
the image processor performs common extension filtering on the second monochrome image data subjected to the differential filtering using a filter size common to all pixels in order to set the maximum luminance as the luminance of the target pixel.

7. The liquid crystal display device according to claim 6, wherein
the luminance difference determinator determines the luminance difference of the second monochrome image data subjected to the common extension filtering.

8. The liquid crystal display device according to claim 7, wherein
the image processor generates the second image data by performing smoothing on the first monochrome image data subjected to the extension filtering, using a filter size common to all pixels.

9. The liquid crystal display device according to claim 1, further comprising
a storage in which a plurality of filter tables are stored, a luminance difference classified into a plurality of levels and filter sizes corresponding to respective levels being stored in each of the filter tables while associated with each other,
wherein
the extension filtering unit obtains gamma setting information, selects one of the filter tables from the storage based on the obtained gamma setting information, and refers to the selected filter table to perform the extension filtering.

10. The liquid crystal display device according to claim 9, wherein
the gamma setting information is information about a gamma value that is set in a system provided outside the liquid crystal display device based on the input video signal.

11. The liquid crystal display device according to claim 9, wherein
the storage includes a first filter table and a second filter table,
in the first filter table, a filter size constructed with a plurality of pixels is set in a range where the luminance difference is greater than or equal to a first threshold, and a filter size constructed with one pixel is set in a range where the luminance difference is less than the first threshold,
in the second filter table, the filter size constructed with the plurality of pixels is set in a range where the luminance difference is greater than or equal to a second threshold larger than the first threshold, and the filter size constructed with the one pixel is set in a range where the luminance difference is less than the second threshold, and
the extension filtering unit selects the first filter table when the gamma setting information is information corresponding to a standard dynamic range (SDR) video, and selects the second filter table when the gamma setting information is information corresponding to a high dynamic range (HDR) video.

12. The liquid crystal display device according to claim 1, further comprising:
a storage in which a plurality of filter tables are stored, the luminance difference and the filter size being associated with each other in each of the filter tables; and
an analyzer that analyzes a characteristic of a luminance distribution of the image based on the input video signal,
wherein
the extension filtering unit selects one of the filter tables from the storage based on the analyzed luminance distribution, and refers to the selected filter table to perform the extension filtering.

13. The liquid crystal display device according to claim 12, wherein
the image processor performs differential filtering to detect a boundary where the luminance changes in the second monochrome image data based on the luminance signal, and performs common extension filtering on the second monochrome image data subjected to the differential filtering to set the maximum luminance as the luminance of the target pixel using a filter size common to all pixels,
the image processor further includes a frame memory in which the second monochrome image data subjected to the common extension filtering is stored, and
the analyzer analyzes a characteristic of the luminance distribution based on an image of the second monochrome image data stored in the frame memory.

14. The liquid crystal display device according to claim 12, wherein
the storage includes a first filter table and a second filter table,
in the first filter table, a filter size constructed with a plurality of pixels is set in a range where the luminance difference is greater than or equal to a first luminance difference, and a filter size constructed with one pixel is set in a range where the luminance difference is less than the first luminance difference,
in the second filter table, the filter size constructed with the plurality of pixels is set in a range where the luminance difference is greater than or equal to a second luminance difference, and the filter size constructed with the one pixel is set in a range where the luminance difference is less than the second luminance difference,
the first luminance difference is smaller than the second luminance difference, and
the extension filtering unit selects the first filter table when a width of the luminance distribution is narrower than a threshold, and selects the second filter table when the width of the luminance distribution is wider than the threshold.

15. The liquid crystal display device according to claim 1, wherein
when the luminance difference is smaller than a threshold, the extension filtering unit performs the extension filtering using a filter size constructed with one pixel, and
the threshold is set based on a characteristic of the input video signal.

* * * * *